Figure 1:
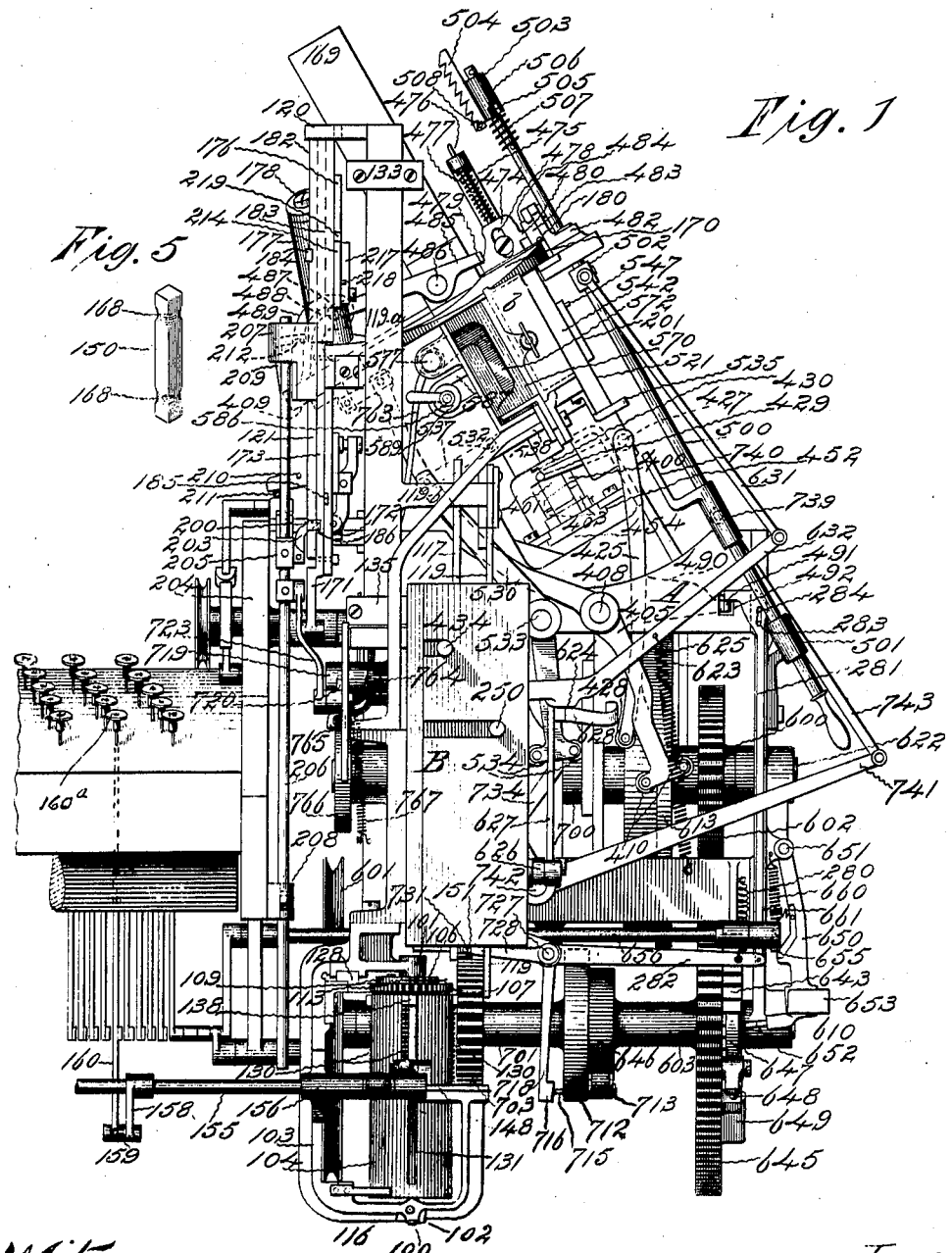

No. 844,564. PATENTED FEB. 19, 1907.
B. M. DES JARDINS.
TYPE JUSTIFYING MACHINE.
APPLICATION FILED AUG. 3, 1898.

16 SHEETS—SHEET 1.

No. 844,564. PATENTED FEB. 19, 1907.
B. M. DES JARDINS.
TYPE JUSTIFYING MACHINE.
APPLICATION FILED AUG. 3, 1898.

16 SHEETS—SHEET 2.

Witnesses:

Inventor
B. M. Desjardins

No. 844,564. PATENTED FEB. 19, 1907.
B. M. DES JARDINS.
TYPE JUSTIFYING MACHINE.
APPLICATION FILED AUG. 3, 1898.
16 SHEETS—SHEET 3.
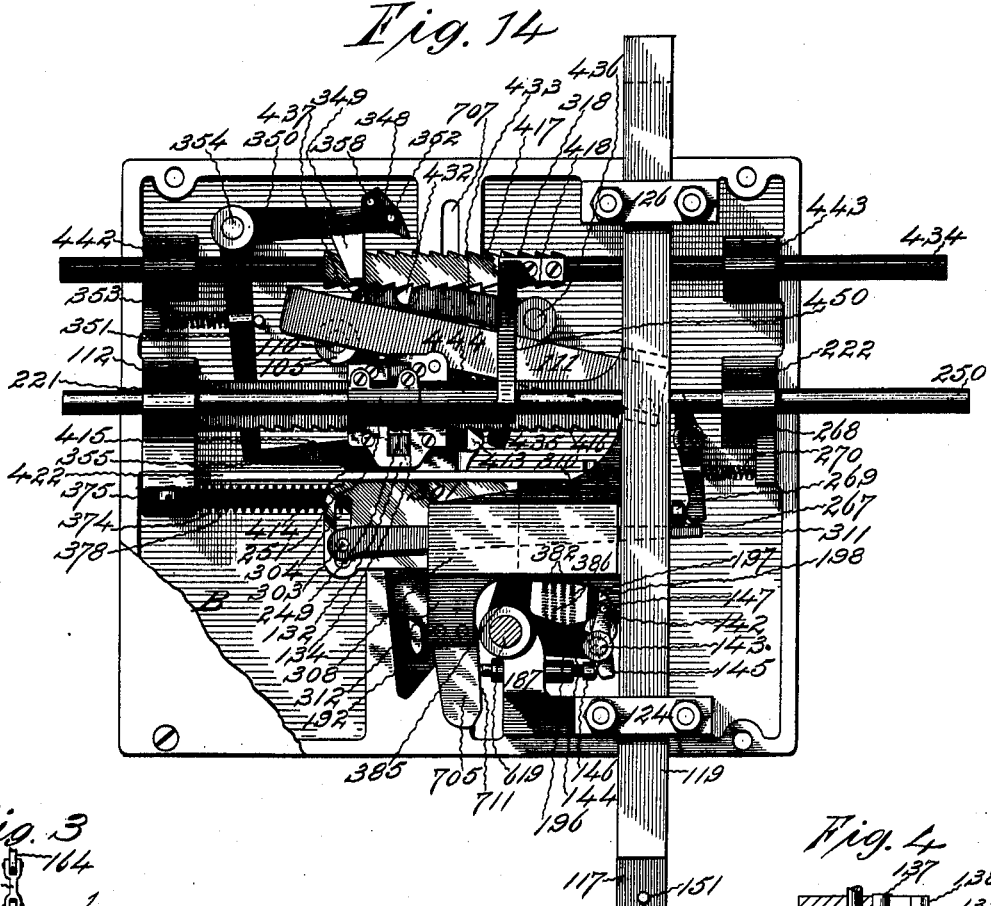
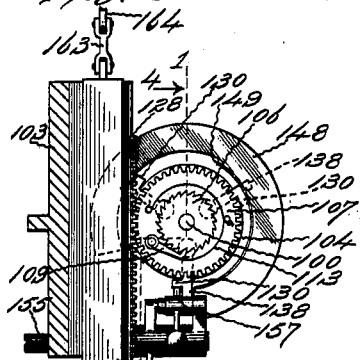
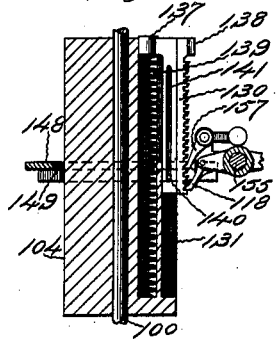
Witnesses:
Inventor:
B. M. Desjardins No. 844,564. PATENTED FEB. 19, 1907.
B. M. DES JARDINS.
TYPE JUSTIFYING MACHINE.
APPLICATION FILED AUG. 3, 1898.
16 SHEETS—SHEET 4.
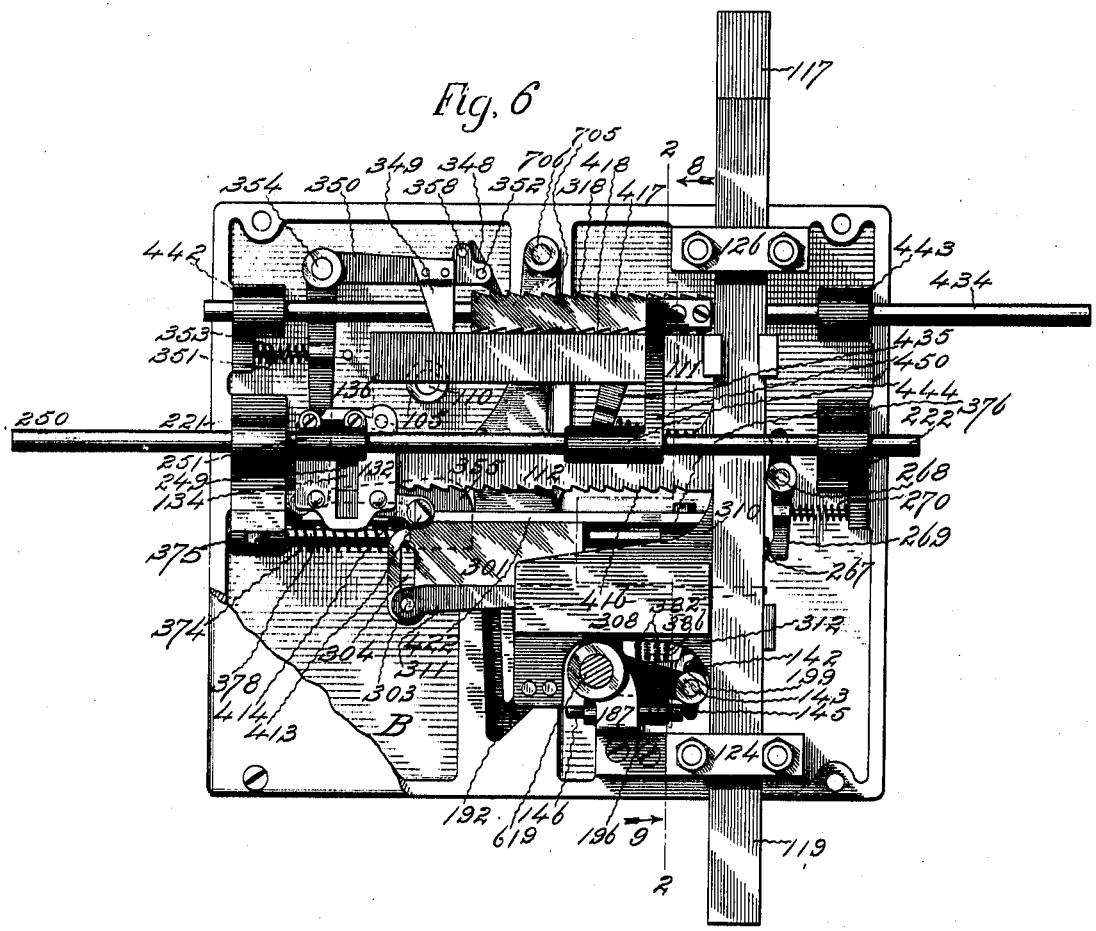
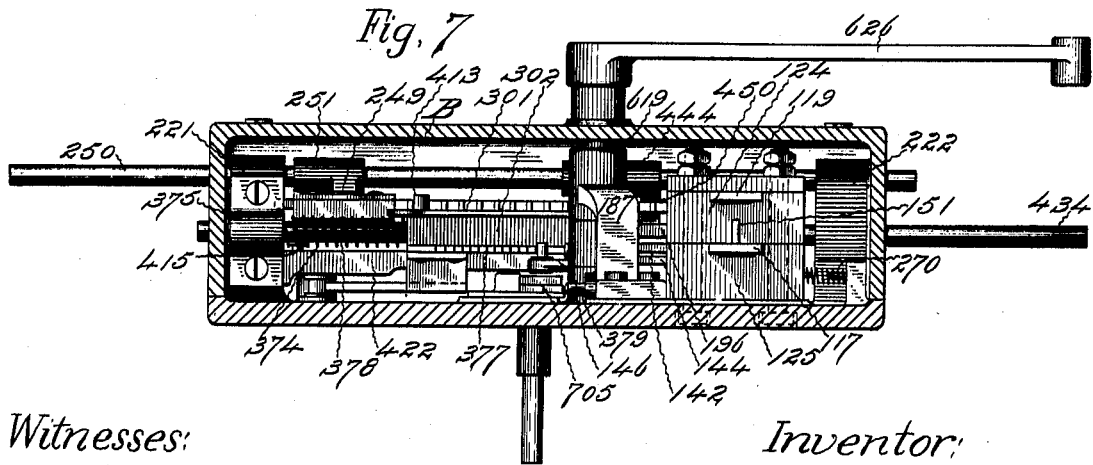
Witnesses: Inventor:

No. 844,564. PATENTED FEB. 19, 1907.
B. M. DES JARDINS.
TYPE JUSTIFYING MACHINE.
APPLICATION FILED AUG. 3, 1898.

16 SHEETS—SHEET 5.

Witnesses:

Inventor:
B. M. Des Jardins

No. 844,564. PATENTED FEB. 19, 1907.
B. M. DES JARDINS.
TYPE JUSTIFYING MACHINE.
APPLICATION FILED AUG. 3, 1898.
16 SHEETS—SHEET 6.
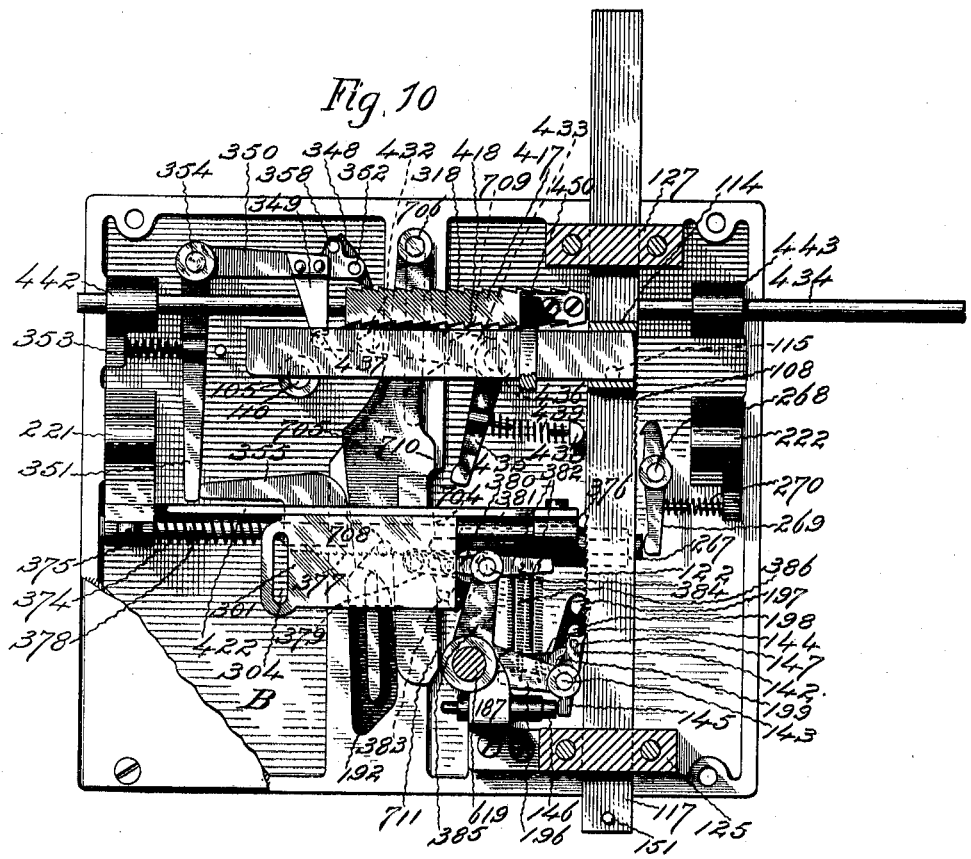
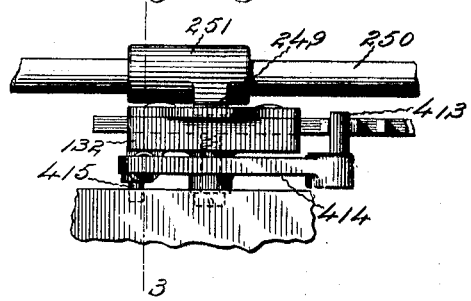
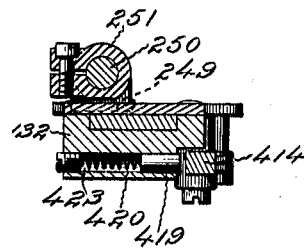
Witnesses:
Inventor:
B. M. Des Jardins No. 844,564. PATENTED FEB. 19, 1907.
B. M. DES JARDINS.
TYPE JUSTIFYING MACHINE.
APPLICATION FILED AUG. 3, 1898.

16 SHEETS—SHEET 7.

Witnesses:

Inventor:

No. 844,564. PATENTED FEB. 19, 1907.
B. M. DES JARDINS.
TYPE JUSTIFYING MACHINE.
APPLICATION FILED AUG. 3, 1898.

10 SHEETS—SHEET 8.

Witnesses:

Inventor:

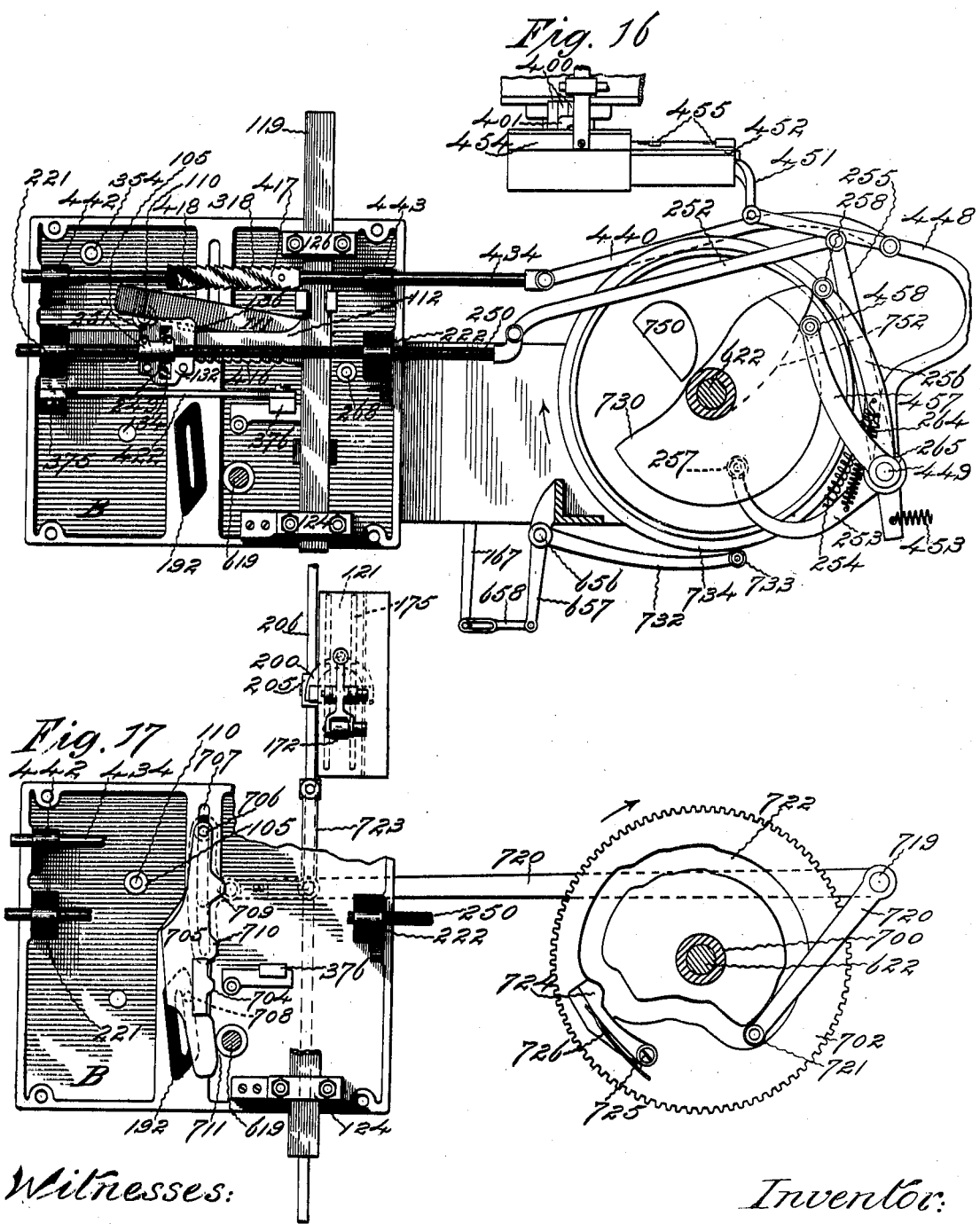

No. 844,564. PATENTED FEB. 19, 1907.
B. M. DES JARDINS.
TYPE JUSTIFYING MACHINE.
APPLICATION FILED AUG. 3, 1898.
16 SHEETS—SHEET 10.
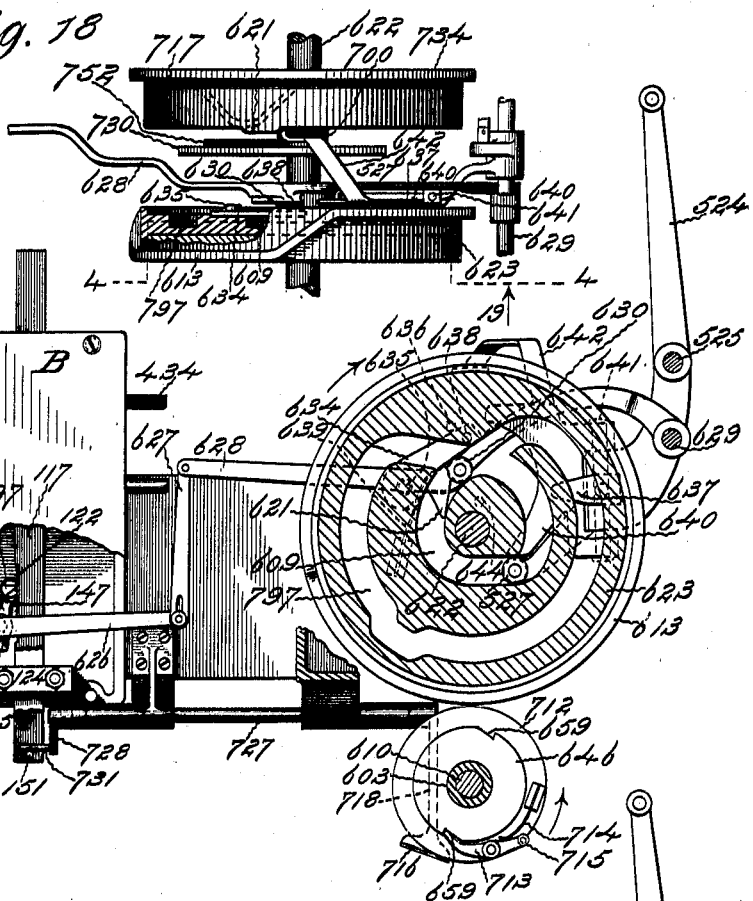
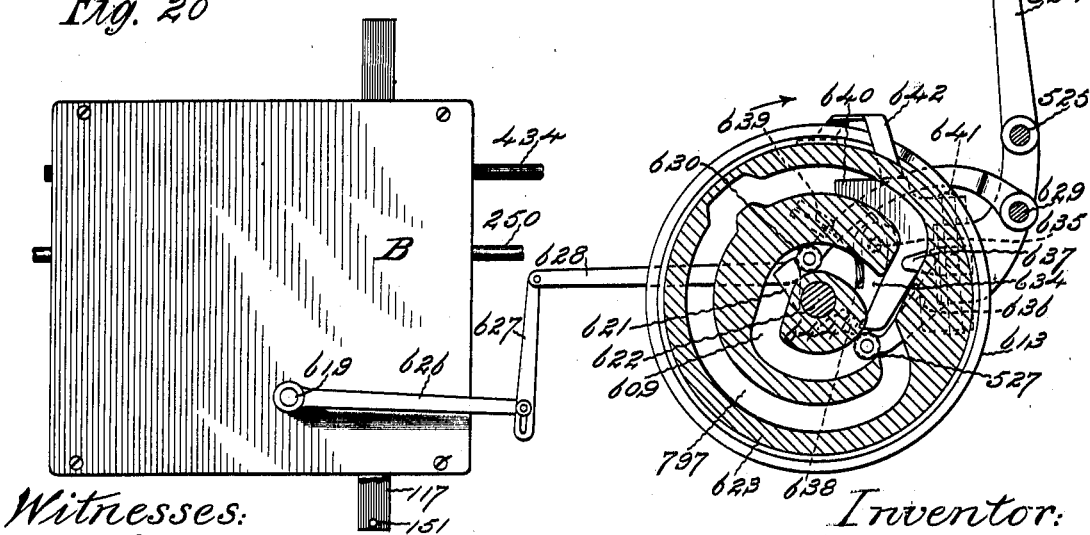
Witnesses:
Inventor:
B. M. Des Jardins No. 844,564. PATENTED FEB. 19, 1907.
B. M. DES JARDINS.
TYPE JUSTIFYING MACHINE.
APPLICATION FILED AUG. 3, 1898.
16 SHEETS—SHEET 11.
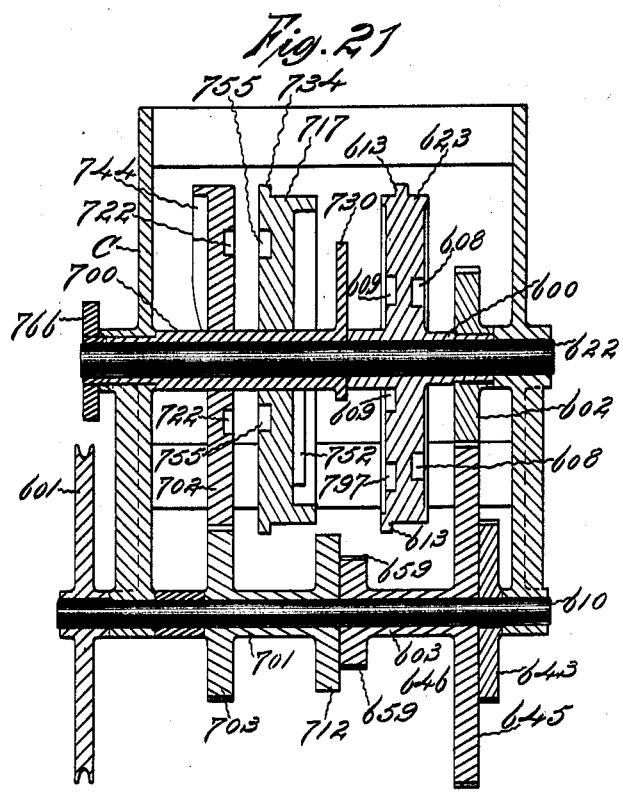

No. 844,564. PATENTED FEB. 19, 1907.
B. M. DES JARDINS.
TYPE JUSTIFYING MACHINE.
APPLICATION FILED AUG. 3, 1898.
16 SHEETS—SHEET 12.
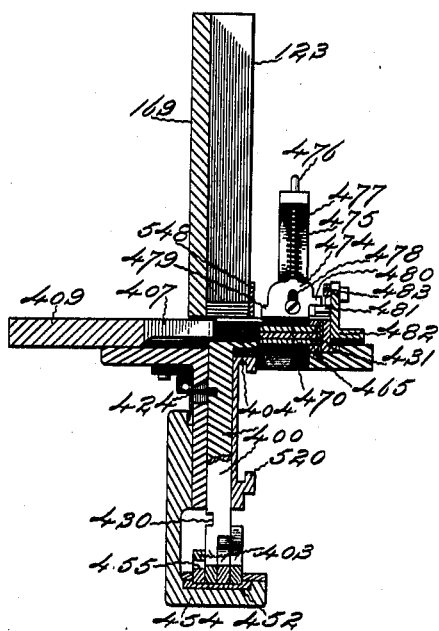
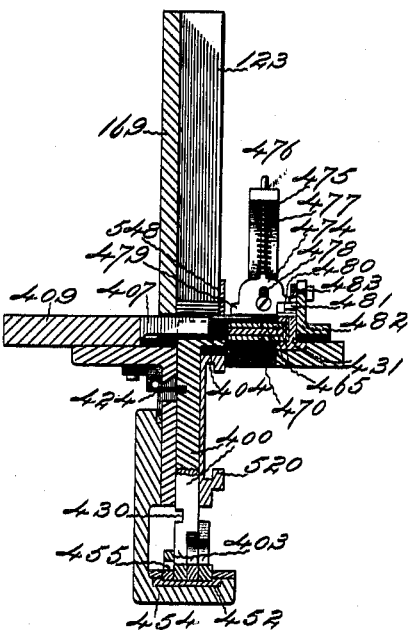
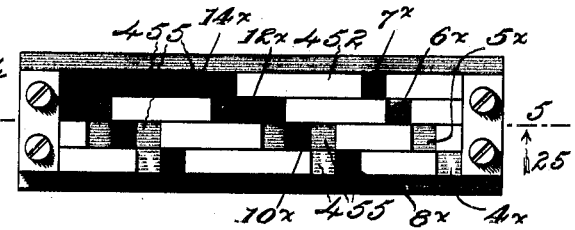
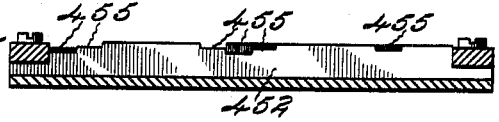
Witnesses:
Inventor:

No. 844,564. PATENTED FEB. 19, 1907.
B. M. DES JARDINS.
TYPE JUSTIFYING MACHINE.
APPLICATION FILED AUG. 3, 1898.
16 SHEETS—SHEET 13.
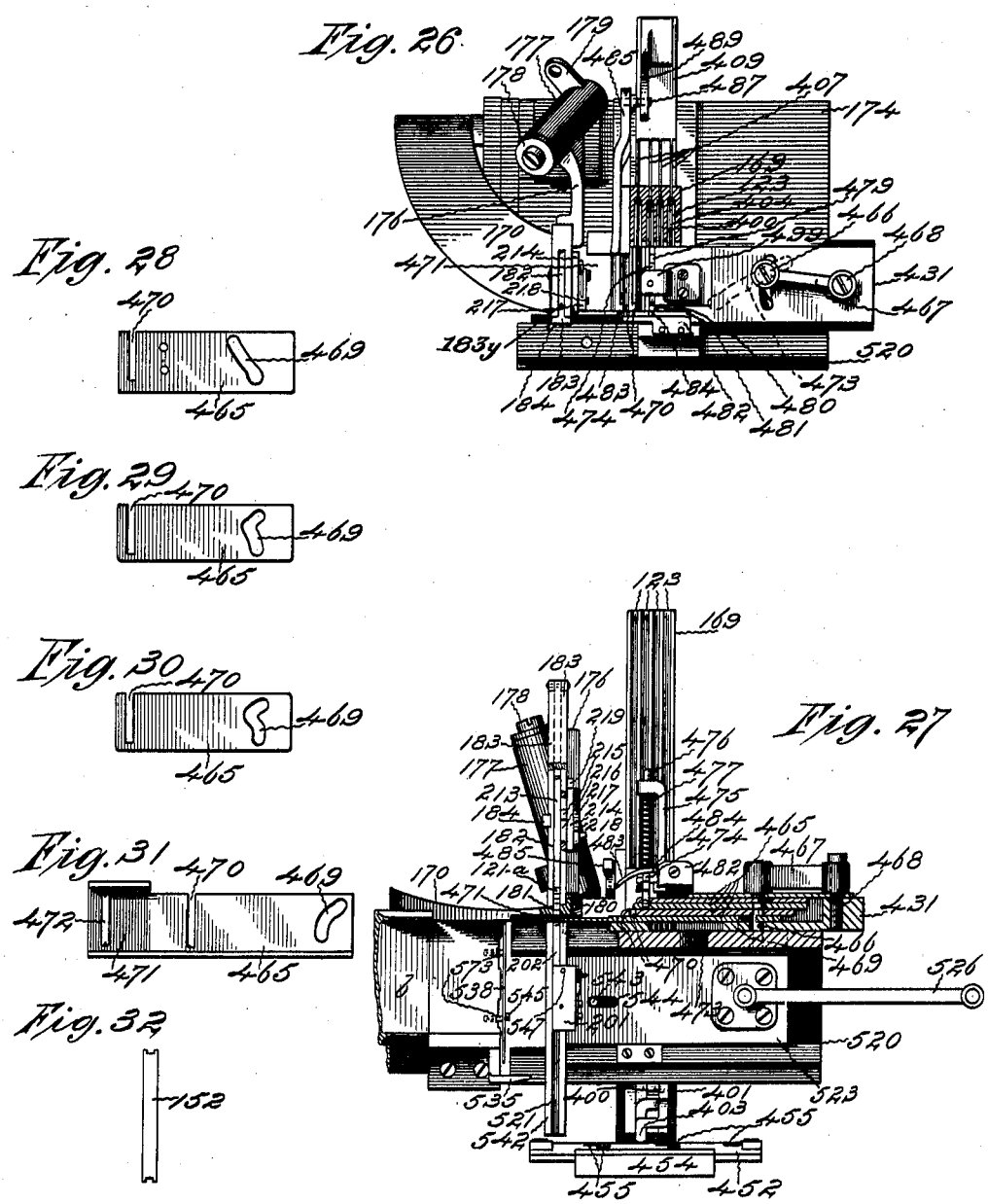

No. 844,564. PATENTED FEB. 19, 1907.
B. M. DES JARDINS.
TYPE JUSTIFYING MACHINE.
APPLICATION FILED AUG. 3, 1898.
16 SHEETS—SHEET 14.
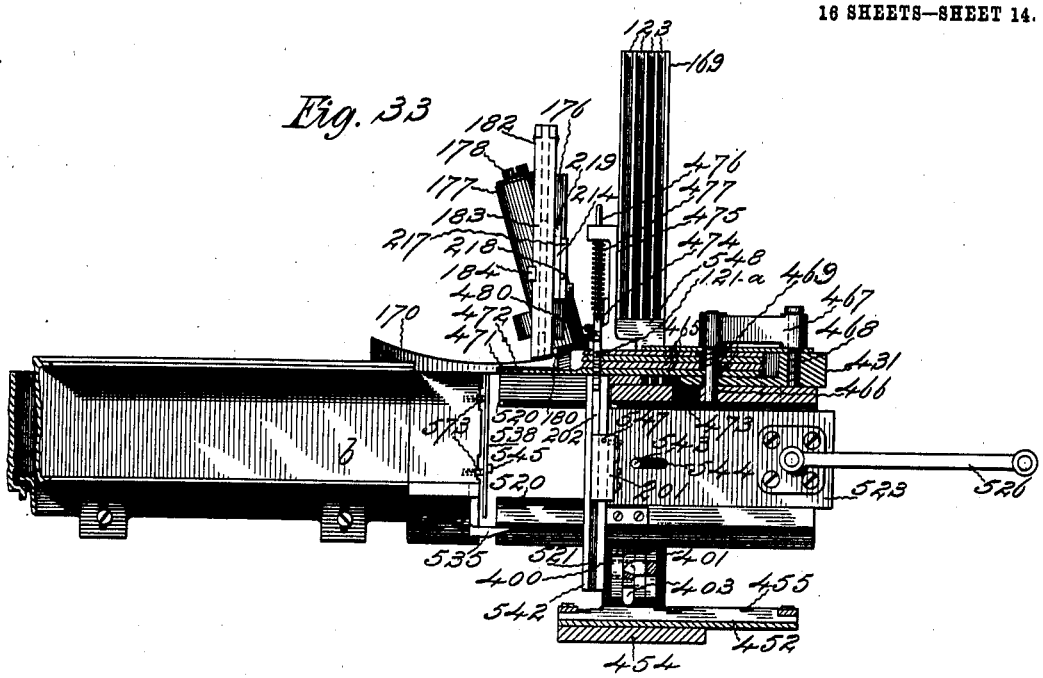
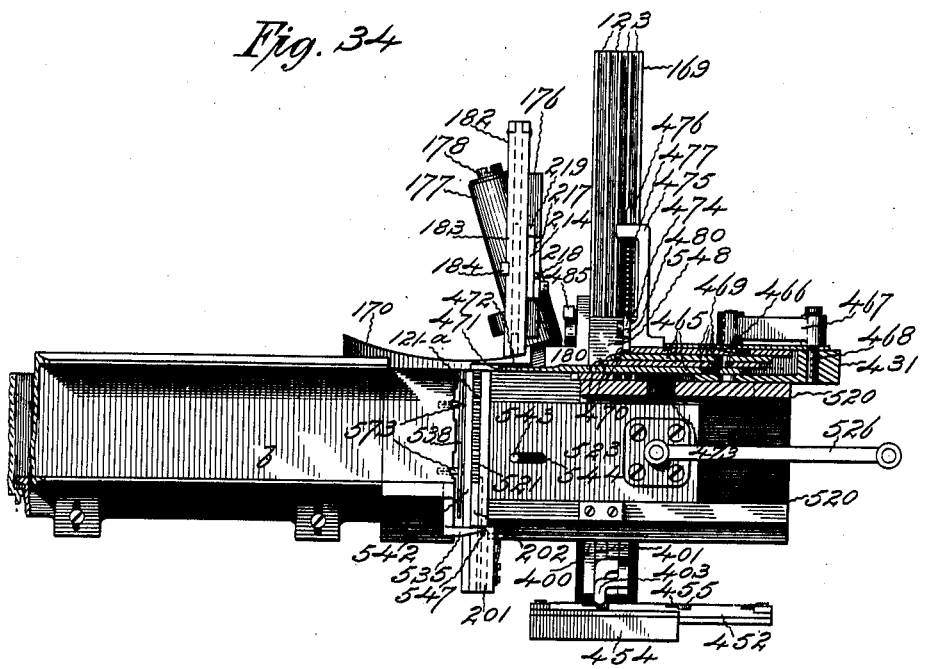
Witnesses:
Inventor:

No. 844,564. PATENTED FEB. 19, 1907.
B. M. DES JARDINS.
TYPE JUSTIFYING MACHINE.
APPLICATION FILED AUG. 3, 1898.
16 SHEETS—SHEET 15.
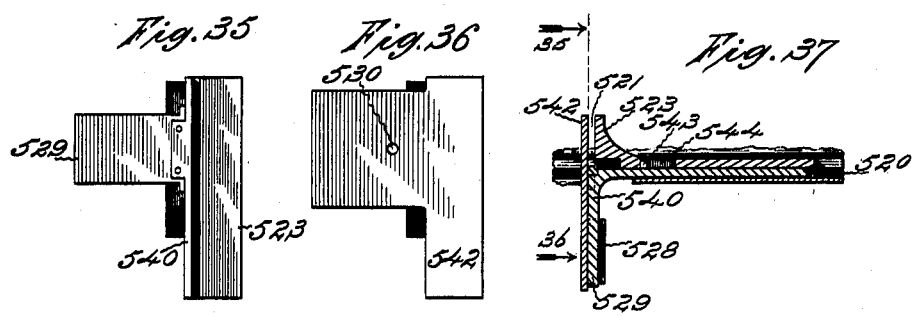
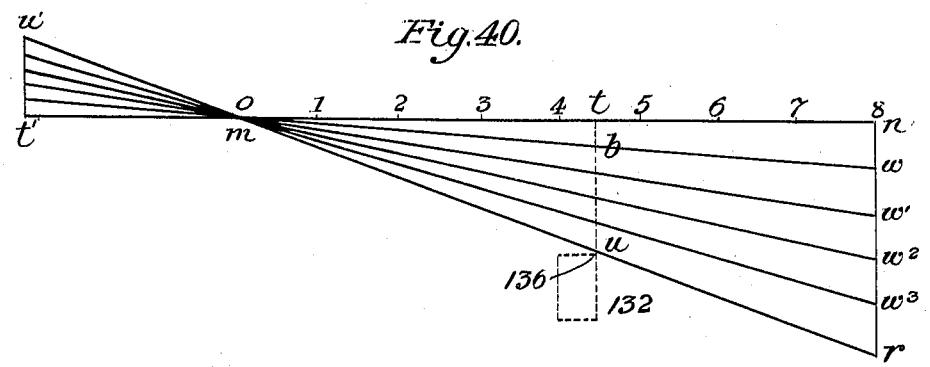
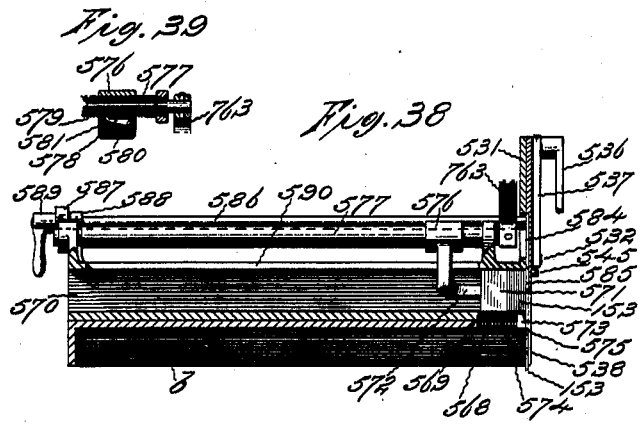
Witnesses:
Inventor:
B. M. Des Jardins No. 844,564. PATENTED FEB. 19, 1907.
B. M. DES JARDINS.
TYPE JUSTIFYING MACHINE.
APPLICATION FILED AUG. 3 1898.

16 SHEETS—SHEET 16.

Witnesses:

Inventor:
B. M. Des Jardins

UNITED STATES PATENT OFFICE.

BENJAMIN M. DES JARDINS, OF WEST HARTFORD, CONNECTICUT, ASSIGNOR, BY MESNE ASSIGNMENTS, TO THE UNITYPE COMPANY, A CORPORATION OF NEW JERSEY.

TYPE-JUSTIFYING MACHINE.

No. 844,564.      Specification of Letters Patent.      Patented Feb. 19, 1907.

Application filed August 3, 1898. Serial No. 687,620.

*To all whom it may concern:*

Be it known that I, BENJAMIN M. DES JARDINS, a citizen of the United States of America, and a resident of West Hartford, Hartford county, State of Connecticut, have invented certain new and useful Improvements in Type-Justifying Machines, of which the following is a specification.

This invention relates to automatic justifying mechanisms, the especial object of the invention being to provide rapid and efficient justifying mechanism for combination with a type-setting machine to receive and justify lines of type set thereby.

The machine illustrated and described herein as embodying this invention is designed to justify lines of type which are set up with provisional or temporary separators between the words. The unjustified lines, provisionally spaced, are assembled by a type-setting machine, which, in the present instance, is operated in conjunction with the justifying-machine, both machines being erected on a common frame. The lines of type of irregular length and provided with provisional separators pass from the type-setting machine to the justifying mechanism, which inserts justifying-spaces in lieu of the separators and deposits the lines in a galley provided for the justified matter.

The justification of each line of type is controlled by two factors, one of which is the shortage or deficiency of the unjustified line and the other the number of word-spaces into which said shortage or deficiency is to be distributed. The shortage or deficiency may be either a plus or minus quantity, depending upon whether the unjustified line is too short or too long. While a line is being assembled a connection of the space-key of the type-setting machine adjusts or sets a movable part of the justifying mechanism in accordance with the number of word-spaces in the line, which part afterward comes into action in the justification of said line. As shown in the drawings, a rack or toothed bar is used as the element for recording the number of word-spaces in the line and several of these bars are arranged on a cylinder, so that while one is being used as a gage for the justifier another may be adjusted for a succeeding line.

Any suitable type-setting machine may be employed. The unjustified lines from said machine are conveyed to a given position in the justifying mechanism and while held stationary for a moment the line shortage or deficiency is measured by one element of the computing devices, while the other element is moved into contact with the rack which represents the number of word-spaces in the line. These two elements jointly control the setting of the space-selecting device. The computing devices determine, primarily, what may be termed the "normal" justifying-space for the line—that is, the average width of space—which width is the quotient of the line shortage divided by the number of intervals between words. The machine illustrated and described herein is adapted to justify by ready-made spaces and is provided with spaces or combinations of spaces differing by units and the justification is usually effected by using some spaces greater than the normal width and some less than the normal width. The proportion of the different sizes of spaces to be used is determined by "difference" devices which are adjunctive to the computing devices.

Spaces of several sizes are stored in the channels of a magazine and means are provided for ejecting one or more spaces from each of one or more channels simultaneously and inserting the space or combination of spaces thus ejected into the line of type in lieu of each one of the provisional spaces, which latter spaces are removed. The spaces in different channels of the magazine are of different widths, the difference between successive sizes being a uniform and small amount which may be termed a "unit." In justifying composed lines of type it is impossible to provide in advance spaces of the exact size necessary for every line; but by a proper selection from a limited number of spaces differing from each other by small units any line may be justified. Such justification is not theoretically correct; but in practice it always comes within a half-unit of the column measure, and ten units may be made sufficiently small to effect practically perfect justification. The best effect is usually produced by using two different space values in each line differing by a single unit, a certain number of word-spaces being filled with the larger space value and the remainder with the smaller space value, as above stated. In this machine the computing devices set the space-selecting devices to select the larger space values first and at the proper time in the justification of the line the space-selecting devices are reset or changed to select smaller space values. This resetting is effected by means of the difference devices above mentioned.

After the line is measured in the receiving-channel it is transferred to the spacing devices and the words of the line are transferred one at a time to another channel. After the first word is transferred a justifying-space is deposited on top of it and the temporary space removed. This operation is repeated until the line is deprived of all temporary spaces and filled out to its proper length with permanent justifying-spaces. The line is then transferred to a galley.

While the justifying-machine is illustrated and described in this specification as attached to a type-setting machine, it will be evident that it may be used independently, the type-lines being assembled on an entirely separate machine and brought to the justifying-machine in a galley or in any other convenient manner. When the type-setting and justifying machines are separated, means are provided in the justifying-machine for counting the word-spaces in the line by causing the type-lines to pass a counting device—such, for instance, as the electrical counting device illustrated and described in my pending application, Serial No. 682,855½, filed June 2, 1898.

The details of construction and operation of the machine will be fully described in the following specification, in connection with the accompanying drawings, in which—

Figure 2:
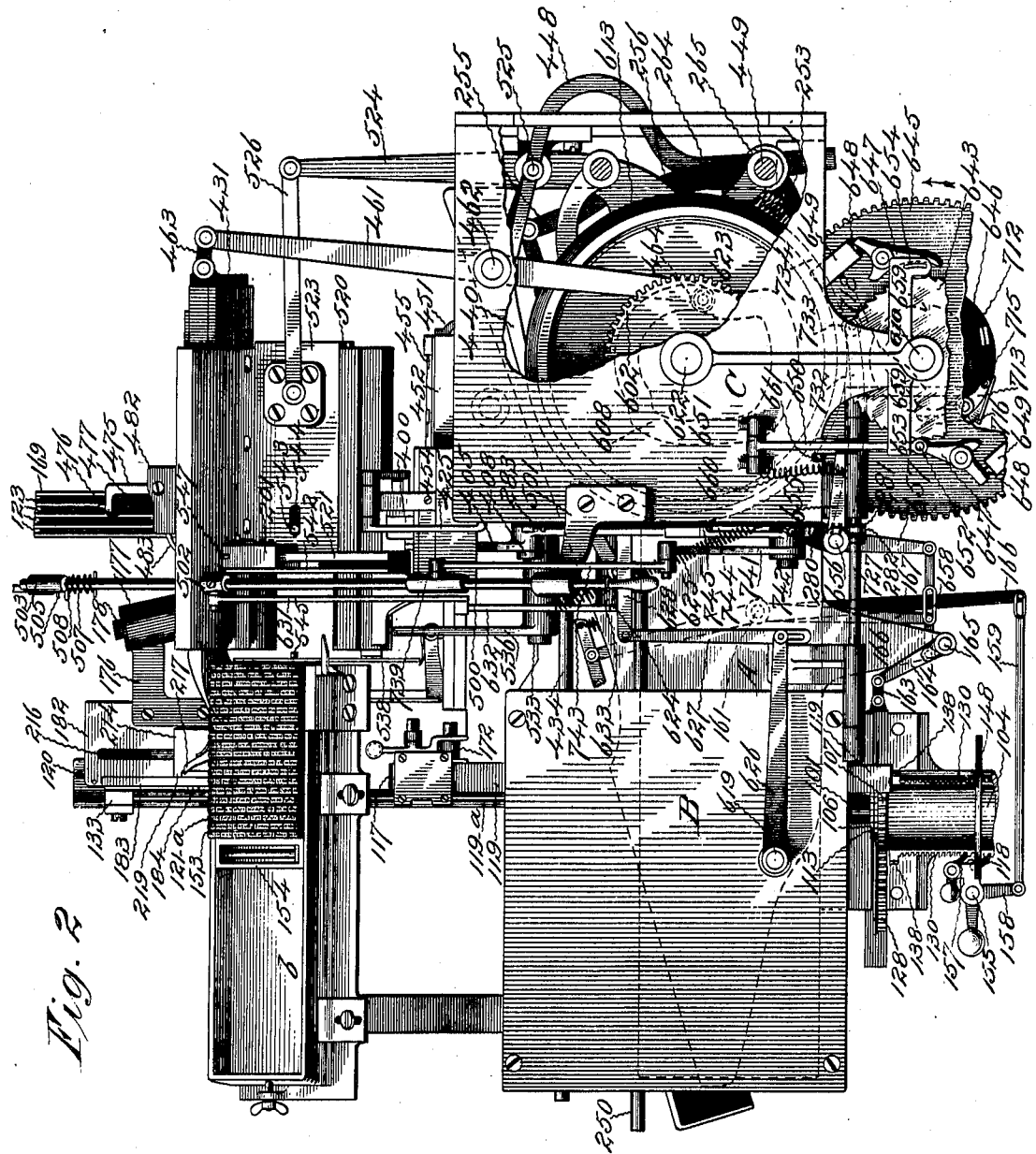
Figure 8:
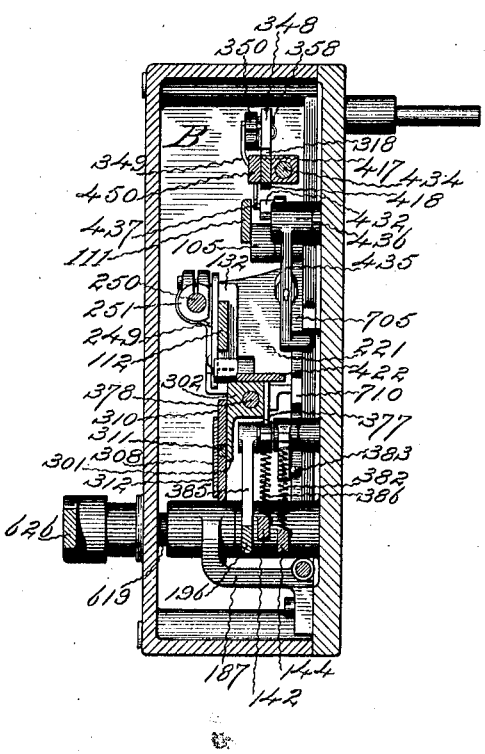
Figure 9:
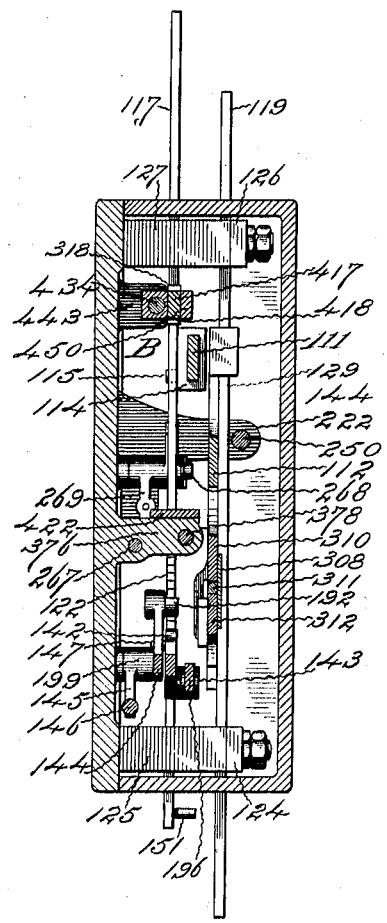
Figure 13:
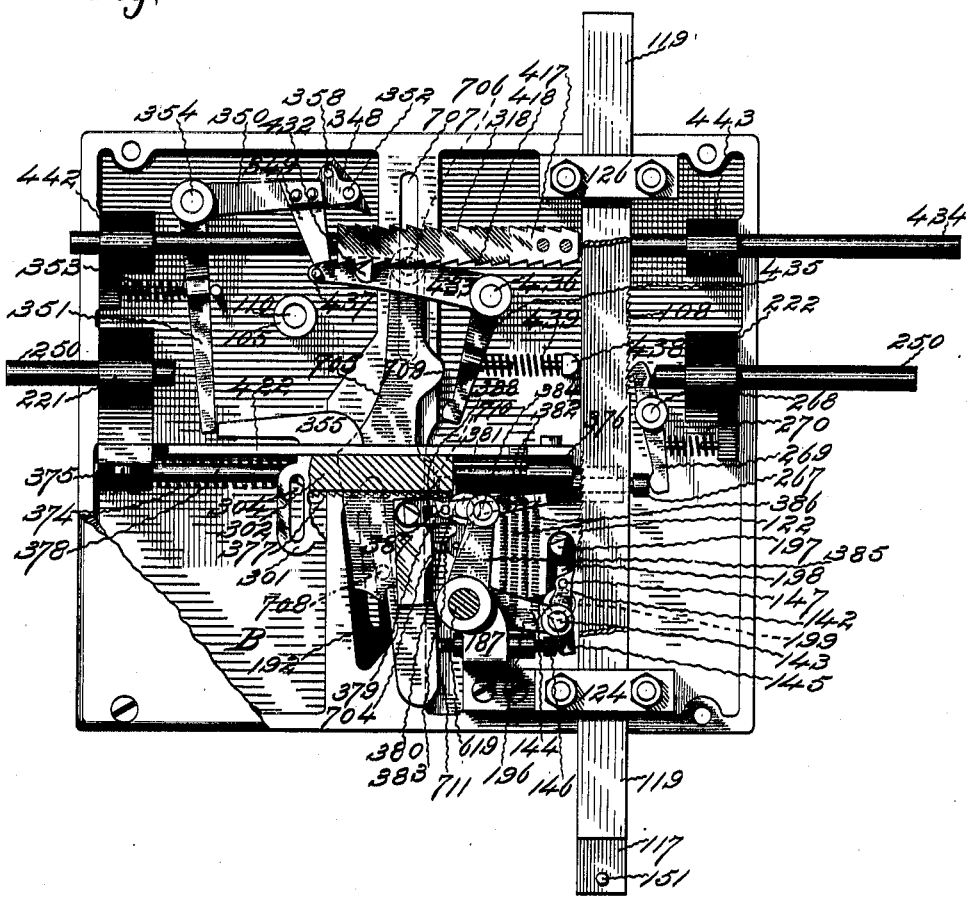
Figure 15:
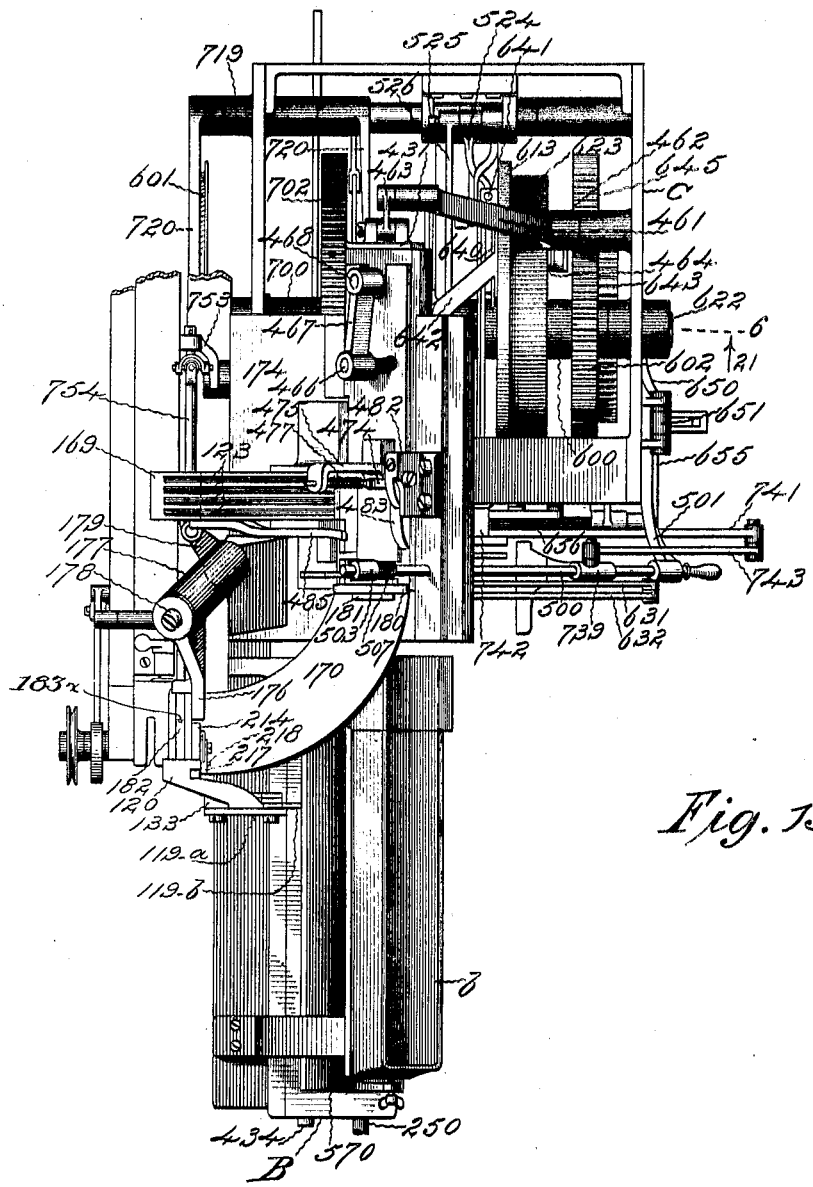
Figure 41:
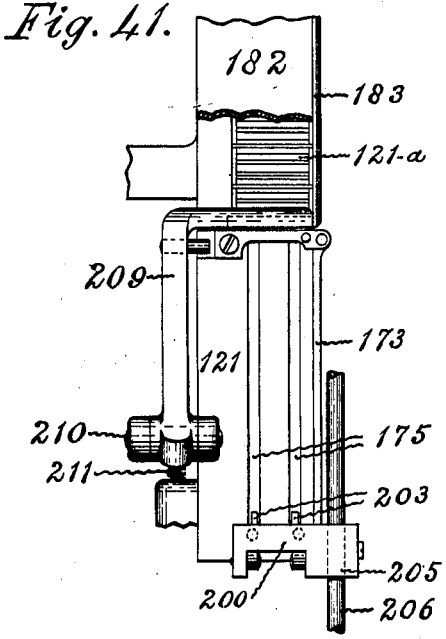
Figure 42:
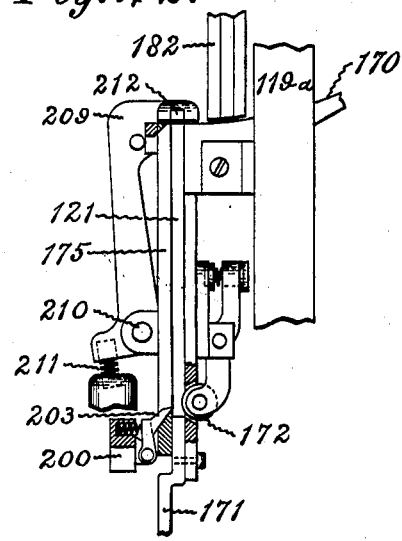

Figure 1 is a front elevation of my machine with the adjoining part of a Thorne type-setting machine. Fig. 2 is a right-hand elevation of said machine having a portion of one of the gears broken away to reveal parts concealed thereby. Fig. 3 is an enlarged top view of the counting device. Fig. 4 is a section of said device on lines 1 1, Fig. 3, in the direction of the arrow 4. Fig. 5 is a full-size perspective view of a line-separator. Fig. 6 is a view of the measuring devices in the Case B, showing the several parts in their initial positions. Fig. 7 is a bottom view of the mechanism in said case, the lower part of the latter being removed and also the wedge-blocks and wedge. Fig. 8 is a transverse vertical section of said mechanism on lines 2 2, Fig. 6, in the direction of the arrow 8. Fig. 9 is a transverse vertical section of said mechanism on lines 2 2, Fig. 6, in the direction of the arrow 9. Fig. 10 is a similar view to Fig. 6, with the exception of the removal of the line-measuring bar, locating-rod, and attached parts. Fig. 11 is a full-size bottom view of the gage-block and connecting members. Fig. 12 is a sectional view of said block and members on lines 3 3, Fig. 11. Fig. 13 is an operative view of portions of the mechanism in Case B. Fig. 14 is an operative view of all of said mechanism. This, with Figs. 6 to 10, inclusive, and Fig. 13, are enlarged views. Fig. 15 is a plan view of said machine. Fig. 16 is a detailed and operative view of a part of the measuring and space-locating mechanisms. Fig. 17 is a detailed view of the line-lifting and cam-plate-operating mechanisms. Fig. 18 is a top view, in partial section of the cut-off channel-operating cam and of the adjacent switch-cam. Fig. 19 is a sectional view of said cut-off-channel cam on lines 4 4, Fig. 18, in the direction of the arrow 19, also showing the line-clutch escapement with the connections between it and said cam and the tangent-bar, line-clutch, and connecting members. Fig. 20 is a similar view to the preceding figure of said cam, showing the switch so disposed as to change the cut-off channel-operating roller from the inside to the outside cam-groove. Fig. 21 is a transverse vertical section through the gears and cams on line 6, Fig. 15, in the direction of the arrow 21. Fig. 22 is a vertical section through the space-channel reservoir, space-plunger, space-collector, and space-selector looking toward the rear, showing these parts operating on a single space. Fig. 23 is a similar view to Fig. 22, but shows said parts in the act of handling two spaces instead of one. Fig. 24 is an enlarged plan view of the space-selecting rack. Fig. 25 is a longitudinal vertical section of said rack on line 5 5, Fig. 24, in the direction of the arrow 25. Fig. 26 is a plan view of the space-handling mechanism. Fig. 27 is a right-side view of said mechanism, the space-collecting carriage and cam-plate being in longitudinal vertical section. Figs. 28 to 31, inclusive, are plan views of the four space-selecting cam-plates, respectively, the last of said views showing the separator-knockout extension of the bottom cam-plate. Fig. 32 is a full-size view of a temporary word-separator. Figs. 33 and 34 are operative views similar to Fig. 27. The latter shows the transferring and cut-off channels alined and the knockout extension-plate in position to eliminate a separator and the cam-plates just beginning to move after receiving their supply of spaces. Fig. 33 illustrates the manner in which said spaces are piled up by said plates and introduced into the type-line below, while Fig. 34 shows said carriage at the rear end of its travel and the cut-off channel in its extreme forward position before collapsing for the purpose of placing the type-line therein onto the receiving-galley. Figs. 35 to 37, inclusive, are detailed views of the cut-off channel. The first of this series shows a front elevation without the sliding plate, as indicated by the arrow 35, Fig. 37, the next is a front elevation in full, indicated by the arrow 36, Fig. 37, and the last a longitudinal horizontal section of the channel members. Fig. 38 is a longitudinal horizontal section through the receiving-galley and rule-receptacle, showing the rule devices. Fig. 39 is a detailed sectional view of the traveling pusher-hub. Fig. 40 is a diagram illustrating the computing devices. Fig. 41 is an enlarged left-hand elevation of the line-lifting and line-separator-removing mechanism; and Fig. 42 is a front view of the same, partially in section.

Similar letters and figures of reference designate like parts in the drawings and specification.

The upper part of the machine is inclined to the left at a suitable angle to handle loose type-lines, as will best appear from Fig. 1; but for the sake of brevity and simplicity in the following description reference to said machine will generally be made as though all parts thereof were standing upright or vertical. As far as practicable the description of the machine will conform to the order of travel of the type-line from the receiving-channel to the receiving-galley.

The reference-numerals herein used conform generally to the following order or arrangement, the numbers for the different grand divisions being, respectively, taken from each one hundred figures employed: The figures employed which are below 100 are the numbers in the drawings used in connection with the section-indicating broken lines and direction-indicating arrows. The figures employed from the first one hundred numbers above and including 100 refer generally to the primary measuring elements, accompanying type-engaging parts, and other miscellaneous mechanism, those above and including 200 to the difference devices and accompanying parts, above and including 300 to the space-dislodging mechanism and parts relating thereto, above and including 400 to the mechanism which feeds the spaces into the line and such word-handling mechanism as is closely related thereto, above and including 500 to the cut-off channel members, rule devices, and allied parts, above and including 600 to the automatic word-actuating mechanism and parts relating thereto, and above and incuding 700 to the automatic line-actuating mechanism. The arrows used in connection with annular members indicate the direction of their revolution.

It is understood that the several members of this machine are suitably journaled to or otherwise mounted in the frame A or the framework of the connected type-setter, the two machines being more or less closely incorporated one with the other at their abutting sides. The lower or power shaft is driven with a constant motion by a belt (not shown) around the pulley 601.

Before proceeding to describe the parts of this machine which actually and directly act upon the type-line it will be necessary to describe a preliminary step with the mechanism for producing it. I refer to the separator-counting device and its operation, which latter depends upon the process of inserting separators in the line of type by the type-setting machine. The result obtained by the counting device for a given line, however, is communicated to the measuring mechanism and utilized during the direct operation of the justifying-machine on said line.

The counting device, which locates the initial position of the bar 117 for determining the number of spaces required in a given type-line and supplying the divider for the quotient sought by automatically counting the intervals between the words, is located near the front of the machine below said bar and is operated by a key on the type-setting machine. This device consists, essentially, of a series of ratchet-bars capable of being engaged in succession or rotation and which in this construction are attached to a rotatable drum and means for alternately actuating the same commensurate with the number of separators in the line, locking and introducing each in turn beneath the tanget counting-bar.

The vertical shaft 100, Figs. 1, 2, 3, and 4, is journaled in the bearings 101 and 102 at the top and bottom of the supporting-frame 103, which is affixed to the frame A. The drum 104 is tight on the shaft 100 with the ratchet-wheel 106, and the gear 107, between said drum and wheel, is loose on said shaft. The pawl 109 is pivoted to the upper side of the gear 107 with its point pressed into engagement with the teeth of the wheel 106 by the spring 113. The stiff spring 116 is fastened at one end to the frame 103, and its free terminal bears against the base of the periphery of the drum 104 to prevent backlashing of the same when rotated. The rack 128 slides in suitable ways provided in the upper part of the frame 103, and its teeth mesh with those of the gear 107. When the rack 128 moves to the rear, the gear 107 turns freely, the pawl 109 clicking inoperatively over the ratchet-wheel teeth and the spring 116 holding the drum 104 stationary; but the reverse movement of said rack causes said pawl to engage the wheel 106 and rotate said drum. The triplicate ratchet-bars 130 are incorporated with the drum 104, which is provided with the vertical slot 131 to receive them. Each bar 130 is provided with the interior lug 137 and the exterior projection 138, both at the top. A spring 139 is introduced into the interior portion of each slot 131, between the bottom of said slot and the under side of the lug 157. The office of the springs 139 is to normally retain the bars 130 in their highest position and to return them to that position when released after being depressed. The travel of each bar 130 is limited by the pin 140, which passes through the bar-slot 141 and is fixed in the drum 104. Located about midway of the drum 104, but independent thereof, is the arc-like horizontal table 148, having the inner extension 149. Said table starts from a point adjacent to the right side of one of the bars 130 when located directly in front and encircles about three-quarters of the drum 104, the extension 149 beginning at the same place and continuing for a little more than one-half that distance. The rock-shaft 155 is mounted in the bearing 156 on the frame 103 and operates the counting escapement, which consists of the counterweighted pawl 118 and the counterweighted dog 157. When the teeth on one of the bars 130 and the escapement are in contiguity, the rocking of the shaft 155 causes the pawl 118 to depress the bar against its spring 139 one notch, the dog 157 locking said bar while said pawl is raised to engage another tooth.

The shaft 155 is rocked by the depression of a space-key 160$^a$ on the attached type-setting machine, a portion of which is shown in Fig. 1, through the medium of the short rocker-arm 158, the connecting rod or link 159, the long rocker-arm 160, pivoted at 161 to the frame, and a push-bar on said machine. (See Figs. 1 and 2.) The rack 128 is reciprocated by means of the link 163, pivotally connecting the rear end of said rack with the rocker-arm 164, which is pivoted at 165 to the bracket 166, the link 658, the arm 167, having its pivot coincident with that of the rocker-arm 160, and a push-bar on said typesetter. The link 658 also extends to the word-clutch arm 657.

Assuming that one of the bars 130 is in operative relation to the counting-escapement and the rack 128 in its forward position, the operation of this counting device is as follows: Every time a separator 152 is inserted in the line of type being set up by the type-setting machine the long rocker-arm 160 is tilted back and forward once, which results in depressing the engaged bar 130 one tooth through the operation of said escapement. When said line is completed, said bar will have been lowered as many teeth as there are separators in said line. The arm 167 is now rocked a sufficient distance to draw back the rack 128 and again actuate it forward, which latter movement rotates the drum 104, carrying said bar out of engagement with said escapement and into engagement with the table extension 149. The teeth on each bar 130 register with the extension 149 at whatever position they may be located by the counting-escapement. The rack 128 rotates the drum 104 until the bar projection 138 is directly beneath the counting-bar 117, which is now released and descends to rest upon said projection. The rotation of the drum 104 has brought another bar 130 into operative relation with the counting-escapement, and when it in turn is carried into engagement with said table extension, the bar 117 having meanwhile been elevated clear of the projection 138, the first-mentioned bar passes beyond said extension and rises to its highest point under the influence of its spring 139 ready for reëngagement with said escapement. When the operator presses the key to actuate the rack 128, he also sets in motion the word and line mechanisms, as will appear from the description of the clutches.

The primary steps in the operation of my machine after counting the separators and receiving the unjustified line of type from the "packer" of the type-setter consists in elevating said line out of the receiving-channel into the measuring and transferring channel, the mechanism for doing which will first be described. The metallic separators 152 are inserted between the words in the line, said separators having recessed ends and being longer than the type 121$^a$, but of the same width, and a large separator 150 is at the end of each line, thereby leaving one at the top and another at the bottom of the same.

The functions of the packer-arm 171, Figs. 1 and 2, and the roll 172 and the process of erecting a type-line in the receiving-channel 121 are too well-known as pertaining more particularly to the type-setting machine to need extended explanation here. The channel 121 is provided in front with the cover 173, which gives access to the interior, said cover being pivoted at the top to the channel-walls and having the spring-latch 185 with which to fasten it and the stop 186 to prevent the same from shutting too far into said channel. Said cover has a projection or ward at its upper end extending into the recesses in the ends of the separators 152, said ward being slightly movable and adapted to bring the type-line into accurate alinement. The channel 121 is further provided with the two slots 175 in its left wall for the accommodation of the prongs 203 of the bifurcated lifting-block 200. The block 200, Fig. 1, is pivotally attached to the sleeve 205, rigid on the line-lifting rod 206, and the prongs 203 are spring-actuated to the right into the slots 175, Fig. 17. The rod 206 is vertically reciprocated at the left of the channel 121 in the frame-bearings 207 and 208 by means of the cam-groove 722 in the gear 702, Figs. 1 and 17, through the medium of the rocker-arm 720, pivoted at 719 to the frame, the roller 721 on one end of said arm operating in said groove, and the connecting-link 723 between the opposite end of said rocker-arm and the sleeve 204 tight on said rod. A portion of the outside wall of the cam-groove 722 is composed of a yielding member incorporated with the gear 702. The yielding member consists of the plate 724, pivoted at 725 to the gear 702 and having its free terminal normally pressed inward by the spring 726. That part of the groove 722 immediately adjacent to the plate 724 is wider than the roller 721, which gives room for more or less play of the same at this point.

The line-separator knock-off block 209, Fig. 1, is pivoted to the frame at 210 and has the spring 211 interposed beneath its lower left-hand end to normally actuate said block to the right across the top of the channel 121. The block 209 is provided at the top with the notch 212 of the same size as the channel-opening. In front of the table 174, Figs. 1 and 15, at the top of the machine is the segmental path or track 170, upon which the line measuring and transferring channel 182 travels. Said channel is capable of describing in its travel an arc equal to the fourth part of a circle and extending from a position directly in front and in alinement with the channel 121 to a position to the right and standing at right angles with the former position. The channel 182 is vertical at its starting-point and in swinging around tilts backward until it is left at an angle of about thirty degrees, thereby being first in a suitable position to receive the line as it naturally comes from the type-setting machine, but leaving said line inclined, a position better adapted for handling loose type matter than the former vertical one. The walls of the channel 182 are rigidly attached to the arm 176, which is integral with the sleeve 177, operating on the stud 178. The stud 178 projects upward at the proper angle from the table 174 to produce the change required for taking and discharging a line of type at the respective angles most convenient for handling the same. The projection 179, extending from the base of the sleeve 177, is connected to the operating-arm 753 by the toggle-joint 754, and said arm is actuated by the line-cam 755. A ball-and-socket connection between the transferring-channel sleeve and its cam-actuated operating-arm or any other suitable means may be employed in place of the toggle-joint 754 to impart the peculiar motion necessary for said sleeve. The travel of the channel 182 to the right is limited by the shoulder 180 on the track 170, and when said channel abuts said shoulder it is in alinement with the opening 181 in said track. The top of the block 209 is in the path of the channel 182 when the latter swings forward, Figs. 1, 2, 15, 26, 27, 33, and 34. Said channel is provided with the word-slide 213, Fig. 27, connected with the plate 214 on the outside of the right channel-wall by the block 215, which operates in the slot 216 in said wall. On the right side of the plate 214 is pivoted the spring-actuated hook 217, limited in its forward movement by the pin 218. The cover 183 fits over the front of the channel 182, being pivoted at the top to the walls of said channel and secured by the spring-latch 184. This cover and the one in front of the channel 121 below are kept closed during the operation of the machine, but may be raised at any other time to give access to the type in the channels. One of the heavy line-separators 150 is introduced into the channel 121 ahead of each line and another behind and serve to prevent the type between from turning. Each separator has the grooves 168, which permit the prongs 203 to pass said separator when it occupies a position at the bottom of the line and act directly on the bottom type, leaving this separator to be elevated by the next line.

As soon as a complete line of type 121$^a$, having the separators 150 at each end and the separators 152 between the words, is within the channel 121 the operator presses the proper key on the type-setting machine to actuate the clutch which sets the word mechanism and indirectly the line mechanism in motion. The rotation of the cam-groove 722 causes the rod 206 to rise with the prongs 203 beneath the type-line, which is carried upward until the top separator 150 enters the notch 212 in the knock-off block 209, when said line is checked in its movement by said block. When the block 200 is in its lowest position, the prongs 203 are forced out of the slots 175; but as soon as said block begins to rise said prongs are thrown in under the line. At this time the roller 721 is in contact with the yielding plate 724, which compensates for the difference in length between unjustified type-lines. The roller 721 next enters the wide part of the groove 722 and the line is held immovable by friction between the several coacting members for an instant while the cam 755 impels the measuring-channel 182 around into its front position. The swinging of the channel 182 into place over the channel 121 also causes the separator 150 to be removed from the top of the type-line and dropped out of the way, since the base of the left wall of said channel 182 strikes the top of the block 209 and forces it over to the left against the resiliency of the spring 211, carrying said separator with it. The path of the advancing line is now clear and the continued rotation of the cam-groove 722 causes it to rise to its full height in the channel 182 beneath the slide 213. The slide 213 is elevated by said line beneath the gage 120, which measures the line with the assistance of the measuring mechanism, after which the transferring-channel 182 changes position under the influence of the continued rotation of the cam 755 and swings to the right against the shoulder 180, taking the type-line with it away from said gage. The rod 206 is now returned to its low position with the prongs 203 out of the channel 121 in readiness for a new line, and the line mechanism ceases to operate.

The computing devices into engagement with which the type-line is transferred when elevated into the measuring-channel 182 will next be described. The measuring mechanism which is embraced in this machine comprises, in addition to the counting and computing devices, the difference devices and the controllers for the line-clutch and the space-value-selecting device. The major part of the above-mentioned mechanism is contained in the case B, which is securely fastened to the front of the frame A. As previously explained, the type-line rises in the measuring-channel 182 beneath the slide 213, and the upper end of the latter encounters the measuring-gage 120, which is thereby elevated until said line is wholly within said channel. The line is now clamped, as it were, between the block 200 and the gage 120, the latter being raised to the height of the unjustified line with the separators between the words therein. The gage 120 when in its high or normal position raises the block 132 in line with the center of the pivot 110. In this action of the machine the gage 120 never rises to its normal high position unless the line with its separators is either the right length or too long. In changing the position of the gage 120 from its position of rest or low point to an operative position it actually leaves untraversed a distance equal to the difference between the present separators and their displacing spaces. Said gage extends to the left from the top of the secondary measuring-bar 119ª, sliding vertically in the bearings 133 and 135. Projecting from the bar 119ª to the right is the extension 119ᵇ, by means of which said bar is rigidly connected with the line-measuring bar 119. The bar 119 extends through the case B, in which it is journaled in the boxes 124 and 126, having a longitudinal movement therein for a distance equal to or a little greater than the maximum difference between the separators and the spaces required to complete or justify a line of type plus the maximum difference represented by the separation of the wedge blocks 310 and 312, said movement corresponding with that of the gage 120. Said line-measuring bar is sufficiently heavy to drop of its own weight to its lowest position and carry with it said measuring-gage, the type-line simply raising them against gravity. Said bar is provided with the line-gage T-blade 112, and this blade, with the upper wedge-block 310, is integral with the auxiliary measuring-bar 129, Fig. 9, which is securely attached to the left side of the bar 119 in such a manner that no lateral play between said bars is possible; but a longitudinal play equal to the maximum difference is permitted. The "difference" here referred to is the difference between a full or justified line and a line spaced uniformly with the largest spaces provided in the machine which will enter into the line without expanding it beyond the column-measure. This difference is measured by the wedge which controls devices for increasing some of the spaces to make up the difference. The lower wedge-block 312 is rigid with the bar 119. The plate 308 is fastened to the right side of the wedge-block 312 and extends over the opening between said block and the block 310, in which the difference-wedge 311 operates. The lower edge of the blade 112 is provided with the space-index teeth 416, and the gage-block 132, having the contact-block 136 pivotally attached to its upper rear corner, is mounted to slide on said blade. The adjusting-pawl 414 is pivoted to the left face of the block 132 below the blade 112 and has its point 413 pressed into engagement with the teeth 416 by means of the pin 419, forced against the front end of said pawl by the spring 420, Figs. 11 and 12, said pin and spring operating in the channel 423.

The pawl 414 is provided on its front end with the pin 415, which comes in contact with the stationary bar 422 when the block 132 is in its lowest position and throws the point 413 out of engagement with the teeth 416. Said bar also limits the downward movement of said block and the blade 112. The bar 119, with the wedge-block 312, moves downward a short distance after the blade 112 has reached its lowest limit, as stated above, to the extent of the full separation of the wedge-blocks. The sleeve 251 is fast to the locating-rod 250, and the sleeve projection 249 enters the slot 134 in the block 132, whereby a transverse or vertical movement of said block in relation to said sleeve is permitted, while a lateral or horizontal movement of the rod 250 carries with it the sleeve 251 and the block 132, Figs. 8 and 14. The rod 250 slides forward and back in the case-bearings 221 and 222 under the impulse of the cams 752 and 750, Fig. 16, and the spring-actuated arms 255, 253, and 256 and the connecting-rod 252. The arms 253 and 255 are rigid with the shaft 449, and the rod 252 connects the upper end of the arm 255 with the rear end of the locating-rod 250. The roller 257 is in the path of the cam projection 750. The auxiliary arm 256 is loose on the shaft 449, but contiguous at its shaft end with the sleeve of the arm 253, which is provided with the slot 265 to limit the independent movement between the two arms. The arms 253 and 256 are tensioned toward each other by the spring 264 connecting the two, and the roller 258 on said arm 256 is forced against the cam 752 by the spring 254, extending from said last-mentioned arm to the frame. The gage-block 132 is forced into the angle formed by the computing-bar 111 and the line-gage blade 112 by the rod 250 acting under the control of the above-described parts at the proper time. When the roller 258 begins to rise on the rotating cam 752, the arm 256 acting against the spring 254 yieldingly swings the arm 253 through the medium of the connecting-spring 264 and causes the arm 255 to draw back the rod 250 until the block 132 enters the angle mentioned above. The arm 256 continues to move upward, now acting against both springs 254 and 264 until the roller 254 passes the high point of the cam 752, thereby crowding said block tightly into said angle. The return of the arm 256 to its former position pushes the block 132 forward as far as the dog 414 will permit, a distance always less than that between two of the teeth 416. After the measurement of the line has taken place and the blade 112 returns the block 132 into its low position, which movement disengages the dog 414, the cam projection 750 comes in contact with the roller 257 and through the intervening mechanism returns said block to its starting-point with a positive action. It will now be readily seen that the peculiar arrangement of the actuating mechanism for horizontally operating the block 132 provides for a sensitive or yielding rear travel, whereby the liability of a shock or jar between said block and the correlative parts of the delicate measuring devices is obviated, an equally sensitive front movement for a short distance only, and finally a positive return travel.

The wedge 311 has its rear terminal inserted between the blocks 310 and 312 and its front end connected to the plate 301 by the pin 303, which enters the slot 304 in the front end of said plate. The plate 301 is integral with the difference-controller ratchet-sleeve 302, having the teeth 377 on the under edge, Figs. 8 and 13. The sleeve 302 is tight on the difference cam-controller rod 378, which reciprocates in the case-bearings 375 and 376. The spring 374 is interposed between the bearing 375 and the front end of the sleeve 302 to return said sleeve to the rear when released from the pawl, presently to be described, and to drive the wedge 311 between the wedge-blocks 310 and 312. The backward travel of the rod 378 and attached parts is limited by the bearing 376, against which the sleeve 302 strikes, and said parts are held at any operative point remote from said bearing by the lock-dog 379 engaging the teeth 377. The pawl 380 forces the sleeve 302 forward against the resiliency of the spring 374 from any given operative position. The dog 379 is pivoted at 381 to a suitable post in the case B and has its front end normally in engaging relation with the teeth 377 by reason of the downward pressure on the rear terminal of the springs 382. The dog 379 is also provided with the depending tripping-finger 383, extending into the path of the cam-plate projection 704. The pawl 380 is pivoted at 384 to the end of the upwardly-extending rocker-arm 385 on the rock-shaft 619. This shaft is journaled in the left side of the case B and in the bracket 187, extending through the right side of said case to be operated by the arm 626, rigid with said shaft, the link 627, and the arm 628, pivoted at 629 to the case C, with its roller 630 in the cam-groove 609, Figs. 2, 7, 10, 18, and 19. The pawl 380 has its front end tensioned into engagement with the teeth 377 by the springs 386, extending downward from the rear terminal of said pawl. The pin 387 projects to the left from the front end of said pawl into the slot 388 in the dog 379. Each time the arm 385 rocks forward and back it causes the pawl 380 to actuate the sleeve 302 one tooth, the pin 387 sliding freely in the slot 388 and the dog 379 locking said sleeve against the spring 374; but when the projection 704 during the downward travel of the cam-plate 705 comes in contact with the finger 383 the latter is forced back, thereby swinging said dog out of engagement with said teeth and also said pawl by means of said pin, leaving said sleeve free to be driven to the rear by said spring. As soon as the projection 704 clears the finger 383 the springs 382 and 386 return the dog 379 and the pawl 380 to their former engaging relation with the teeth 377. The dog 379, pawl 380, and rocker-arm 385 are termed the "difference-controller escapement."

The cam-plate 705 is located on the inside face of the left-hand side of the case B and has at its upper end the stud 706, passing through the slot 707 in said side. The pin 708, which is affixed to said plate, follows the groove 192 in said left-hand side. In addition to the engaging projection 704 the plate 705 is provided with the projections 709 and 710 above said projection 704 and the projection 711 below the same. The cam-plate stud 706 is operated vertically in the slot 707 through the medium of the arm 720, operated by the cam-groove 722, the cam-plate 705 doing its work at the time the rod 206 is depressed by said arm. The pin 708 in tracking the groove 192 gives an oscillating motion to said plate as it is reciprocated with said stud. When the plate 705 travels downward, the pin 708 follows the rear portion of the groove 192, crowding said plate backward into engaging relation with the finger 383 and other members soon to be specified, and upon the upward travel of said plate said pin takes the front portion of said groove and throws the plate forward out of the way of projecting parts.

The space-value locating-rod 434 slides forward and back in the case-bearings 442 and 443, being actuated by the cam 730 on the line-sleeve 700, the arms 440 and 448, and the spring 453, Fig. 16. The ratchet-bar 417 is rigidly affixed to the rod 434 and also has a connection with the rod 250 by means of the sleeve 444 and the arm 450, the former sliding on said rod 250. The ratchet-bar 417 is provided on its lower edge with the teeth 418 and on its upper edge with the difference-teeth 318. For purposes hereinafter clearly set forth the forward movement of the ratchet-bar 417 is governed or limited by the difference-trip 348 and the dog 432. The trip 348 is pivoted at 352 to the rocker-arm 350, which, with the depending rocker-arm 351, is pivoted at 354 to the side of said case. A limited amount of play is permitted the trip 348 by the pin 358. The tripping-finger 349 depends from the arm 350 just forward of said trip. The spring 353 is interposed between an extension of the bearing 442 and the arm 351 and normally retains the trip 348 out of engagement with the teeth 318 on the bar 417; but when the sleeve 302 is forced forward to its full extent the tripping-finger 355, projecting from said sleeve, encounters the lower end of the arm 351, presses it to the front against the spring 353, and depresses the trip 348 into engagement with said ratchet-bar teeth, Figs. 13 and 14. The dog 432 projects from the rocker-arm 433, rigid with the depending arm 435 and pivoted at 436 to said case. The spring 439 is introduced between the arm 435 and the part 438, projecting from the side of the case, and said spring normally causes the dog 432 to engage the teeth 418 on the bar 417. The base of the arm 435 lies in the path of the projection 709, and when the cam-plate 705 is carried downward said projection swings the dog 432 clear of said ratchet-bar teeth and allows the rod 434 to move forward until the sleeve 444 comes in contact with the sleeve 251. The pin 437 projects from the front end of the arm 433 into the path of the finger 349, and when the latter is depressed with the trip 348 said pin is encountered and the dog 432 disengaged from the teeth 418, thereby permitting the rod 434 to move forward one tooth before being checked by said trip, owing to the vibration of the latter. Thus it will be seen that two methods for releasing the bar 417 from the dog 432 are provided, one operating after the other. The bar 417 can be freely drawn to the rear, the teeth 318 or 418 slipping past the trip 348 or the dog 432, as the case may be. The rod 434 is also connected with the space-selecting rack 452 by the arms 440 and 448 and the rack-arm 451, Fig. 16.

The counting-bar 117 has its bearings in the boxes 125 and 127, sliding vertically therein to the left of the bar 119, Figs. 7 and 9. The downward movement of the bar 117 is limited by the counting device, said bar dropping by gravity. The bar 117 is provided on its rear edge with the locking-teeth 108. The dog 269 is pivoted at 268 to the case B behind the bar 117, and its engaging end is normally held out of contact with the teeth 108 by the spring 270, interposed between the lower terminal of said dog and a projection on the bearing 222. The lower end of the dog 269 is pressed against the contiguous end of the plunger 267 by the spring 270. The plunger 267 has a suitable slideway in the bearing 376, and its front end lies in the path of the cam-plate projection 710. When actuated by the projection 710, the plunger 267 causes the dog 269 to engage the teeth 108 and lock the bar 117; but as soon as the projection 710 clears the plunger 267 the spring 270 releases the bar 117 from the dog 269.

On the front edge of the bar 117, but below the teeth 108, are the counting-teeth 122, by means of which and the pawl 142 said bar is elevated step by step, the lock-dog 197 preventing the dropping down of the former as said pawl raises it. The dog 197 is pivoted at 199 to a suitable post in the case B and has its upper end normally in engaging relation with the teeth 122 by reason of the upward pressure on the extension 144 of the springs 382. The tripping-finger 145 depends from the dog 197 and bears on the head of the plunger 146, which extends into the path of the lower cam-plate projection 711. The pawl 142 is pivoted at 143 to the end of the rearwardly-extending rocker-arm 196, rigid with the arm 385 and the shaft 619. The pawl 142 has its upper end tensioned into engagement with the teeth 122 by the springs 386, extending upward from the front terminal of said pawl. The pin 147 projects to the left from the upper end of said pawl into the slot 198 of the dog 197. Each time the arm 196 rocks up and down it causes the pawl 142 to actuate the bar 117 one tooth, the pin 147 sliding freely in the slot 198 and the dog 197 locking said bar against its tendency to drop by gravity; but when the cam-plate projection 711 comes in contact with the plunger 146 said dog is forced out of engagement with said teeth, carrying with it said pawl. The length of the projection 711 is sufficient to allow the dog 269 to be thrown into engagement with the teeth 108 and out again while the escapement just described is under the influence of said projection. The bar 117 is now free to slide downward so far as the ratchet device just described is concerned. When the finger 145 is no longer influenced by the projection 711, the springs 382 and 386 return the dog 197 and the pawl 142 to their former engaging relation with the teeth 122. The springs 382 serve for the two dogs 379 and 197, and the springs 386 serve for the pawls 380 and 142, being used in pairs in both cases to obviate the liability of accident and insure perfect operation of the attached parts. The dog 197, pawl 142, and arm 196 are termed the "clutch-controller escapement."

The mechanism and its operation thus far described has fully revealed the interrelation of the two vertical slide-bars 117 and 119, with the means whereby the former is displaced one step to represent each space which the line requires and the latter an amount requisite to determine the full shortage of the line less the temporary separators between the words. The remaining details of the computing devices will now be described, and the description of the mechanism and operation will be supplemented by an explanation of the underlying principles upon which they act.

The several members in the case B occupy substantially the positions shown in Fig. 6 at the time the slide 213 on top of the type-line in the channel 182 comes in contact with the gage 120, and the chronological movement of these members takes place as follows, it being borne in mind that both the word and line mechanisms have been set in motion by the operator. The bar 119 moves upward and the cam-plate 705 releases the bar 117, which drops onto the bar 130 below, when it is locked by the dog 269, the rear end of the bar 111 being depressed by said bar 117. The rod 250 carries the contact-block 136 into the angle formed by the bar 111 and the blade 112. Simultaneously with the setting of the dog 269 against the bar 117 by means of said cam-plate occurs the releasing of the ratchet-sleeve 302 by the same means, which drives the wedge 311 between the wedge-blocks 310 and 312 and releases the ratchet-bar 417 from the difference-tripping arm 350. The dog 432 rises to engage the teeth 418 on said ratchet-bar when the arm 350 releases the teeth 318 from the trip 348. Further movement of the cam-plate 705 releases the difference-controller escapement, which proceeds to act upon said ratchet-sleeve, allows the dog 269 to be actuated away from the teeth 108 by the spring 270, releases the line-clutch escapement, which proceeds to elevate the bar 117, and disengages the dog 432 from the teeth 418. At once the rod 434 is driven forward until the sleeve 444 strikes against the sleeve 251, which latter is thereby forced forward with the block 132 until the point 413 engages one of the teeth 416 if said block has not already been actuated into this position by the rod 250 and its connections. The dog 432 at once reëngages the teeth 418. This last movement of the block 132 determines the difference, and the next movement of the ratchet-bar 417 mechanically communicates said difference to the space-selecting devices for actual use. The movement of the bar 417 above referred to takes place when the ratchet-sleeve 302 swings the trip 348 into contact with the teeth 318 and the dog 432 out of contact again with the teeth 418, said trip allowing said bar to move one tooth, thereby determining which combination of spaces shall be used. The clutch-pin 715, Fig. 2, rides onto the shoe 716 and causes the line mechanism to stop, and the latter continues to remain stationary until the bar 117 is actuated into its high position by the line-clutch escapement. After the word mechanism has justified the line in accordance with the previous action of the computing devices, main and subordinate or auxiliary, the line mechanism operates to restore the members in the case B to their initial positions and finally disengage both line and word actuating parts.

The main computing element is comprised in the bar 111, which is inclined with reference to the number of intervals in the type-line to indicate the number of spaces needed in the line being measured. This bar is a straight edge attached near its front end by the rotary pivot 110 to the case B, said pivot extending into said case from the left side thereof. The center of the pivot 110 is fixed and indicates the required length of the type-line. The upward and downward inclines of the bar 111, taken on either side of its pivotal center, are used for measuring the amount of difference existing between the unjustified type-line and the length required by the width of the column or page for which said line is being justified, and the relation of its position to the line gage or block 132 designates the amount of shortage, while the degree of its incline denotes the number of spaces required. The lower edge of the bar 111 cuts the center of the stud 105, being fastened to the upper half of the pivot-ring 110 to afford an unobstructed path for the contact-block 136 along the bottom edge of the bar 111 both in front of and behind said pivot. The amount of incline of said bar or gage is changed to conform or agree with the number of space values required, so that the same indexes which designate the sizes of space values required are employed to denote the full amount of deficiency, whatever may be the number of parts into which this deficiency must be divided. That portion of the bar 111 extending forward of its pivot 110 constitutes an opposite gage to that employed to measure deficiencies and is employed for determining the amount of reduction which a line, with its separators, may need in case its length is slightly in excess of the measurement required. The rear end of the bar 111 slides in the box 114, pivoted at 115 to the slide-bar 117, the path of the travel of said bar vertically being on a tangent with the arc described by the radial bar 111 and, determining the tangent at whatever point its intersection may be, determines at its successive positions the amount of inclination in said computing-bar necessary to gage the line deficiencies which require different numbers of space values. The various positions of the bar 117 are determined by the counting device and the teeth 122, which correspond with the teeth on the counting ratchet-bars 130. When the downward movement of the cam-plate 705 throws the counting-escapement out of engagement with the teeth 122 on said bar, the latter drops onto the adjacent counting ratchet-bar projection 138, in which position it is locked for an instant by the dog 269, while the block 132 is forced into the angle between the bars 111 and 112. The continued movement of the cam-plate 705 next releases said bar from said dog and also said escapement, which proceeds to return the bar step by step to its starting-point. The amount of inclination given to the computing-bar 111 by each step of the counting device is determined by the sizes of the preconstructed spaces with which the machine is provided, the distance from the pivot 110 to the counting-bar, and the distance apart of the teeth 416.

The bar 119, which, through the medium of the extension 119$^b$, the bar 119$^a$, and the gage 120, virtually rests upon the type-line to determine its length, is provided, as stated, with the gage-carrying blade 112 for designating the length of a line with reference to the bar 111, which indicates the amount of spacing needed. The blade 112 extends forward of the pivot 110 and parallel with the computing-bar 111 when the latter is located in its normal or starting position, being at right angles with the bar 119. The blade 112 determines the path of the gage-block 132 and its contact-block 136, said gage-block being made to slide on said blade, with said contact-block adapted to bear on the under edge of said bar. The gage-block 132 thus has a movement parallel to the normal or horizontal position of the bar 111 to the right and left along the blade 112. In its adjustment said blade is located a certain distance below the pivot 110 in order that when the type-line is full the contact-point represented by the block 136, at whatever place it may be located along said blade, will be in the plane of the center of said pivot and against the lower edge of said computing-bar. The gage 120 being connected with the blade 112 and resting upon the type-line locates the position of the gage contact-block 136 a distance below the center of the pivot 110 equal when wedge 311 is withdrawn to its normal position to the shortage of the line measured with its separators. The gage-block 132 is now moved sensitively to the rear toward the intersection of the bar 111 with the blade 112 until its contact-block 136 is intercepted against the engaging edge of said bar, thereby determining what size of space would actually justify the line if the machine was able to provide any required size—that is, the average or normal size of spaces necessary for justification. The teeth 416 on the under edge of the blade 112 indicate the size of spaces with which the machine is provided, and at this time the point 413 of the dog 414 on the under side of the gage 132 is probably located at some intermediate point between two of said teeth.

The devices heretofore described are adapted to mathematically divide the shortage of the unjustified line by the number of word spaces or intervals in the line to determine the exact width of the normal justifying-spaces required to be inserted in the intervals to justify the line. As a matter of fact, it is impossible to provide in advance the indefinite number of sizes of spaces which would be required for the most accurate justification if all the spaces in the line were required to be equal, and for that reason I have provided mechanism, to be described hereinafter, which will select combinations of spaces from a limited number of sizes to justify the line with great exactness. The mechanism heretofore described, however, determines with mathematical correctness the quotient of the space to be filled divided by the number of intervals, which quotient, of course, equals the size of the uniform individual spaces which would be necessary to justify the line. In explaining this mechanism the presence of the separators in the line of type under treatment may be disregarded, as said separators are eliminated from the problem by simply increasing the width of the spaces indicated by the machine by an amount equal to the width of the separators which are ejected from the line before the spaces are inserted. In other words, if five-unit spaces are required to justify the line and the separators are equal to two-unit spaces then the justifier would indicate three-unit spaces as necessary for justification; but it would be made to select five-unit spaces or three-unit spaces plus an amount equal to the width of one of the separators.

I obtain the quotient of the shortage of the line divided by the number of intervals by constructing mechanically two similar triangles. The dimensions of one of the triangles are known quantities, and one of the dimensions of the remaining triangles being known the remaining dimensions, one of which will be proportional to the quotient sought, are readily obtainable.

Referring to Fig. 40, $m\ n\ r$ indicates a right-angled triangle, in which the side $n\ m$ represents a justifying-space, which, for instance, may be eight units, as indicated on the diagram. The side $n\ r$ represents the number of intervals in the line and is equal to the number of intervals multiplied by eight-unit spaces. The side $m\ n$ is always constant, and the side $n\ r$ is a known quantity, determined by the number of intervals. In the second triangle $m\ t\ u$ the side $t\ u$, which is parallel to $n\ r$, is equal to the measured shortage of the line under treatment. If now we indicate by $w\ w'$, &c., the eight-unit spaces on the side $n\ r$ and draw lines from $m$ to the points $w\ w'$, the shortage of the line $t\ u$ will be divided into a number of equal parts, and each of these parts, as $t\ b$, will equal the quotient sought. It will also be evident that if $m\ n$ represents eight units $m\ t$ will represent the quotient sought in the same proportion. As shown on the diagram, the quotient of the shortage $t\ u$ divided by the number of intervals equals $4\frac{1}{2}$, and the line under treatment will be justified by inserting spaces of four and one-half units plus the thickness of the separators which are removed.

Comparing the diagram Fig. 40 with the mechanism in Fig. 14, the line $m\ n$ corresponds to the lower edge of the computing-bar 111 when the latter is in its normal horizontal position. The line $n\ r$ corresponds to the downward movement of the bar 117. The space $n\ w$ corresponds to one tooth of said bar or its movement for each word-space in the line. The line $t\ u$ corresponds to the shortage of the line. The point $u$ is the place of contact of the point 136 with the bar 111, and the distance $m\ t$ is the amount of movement of the contact-point 136 when drawn over by the rod 250, provided said point starts from the vertical line through the pivot 110. The distance $m\ t$ is simply proportional to the thickness of the quotient-space and is, in fact, very much greater. It will be evident that this movement in proportion to the desired space may be utilized in many ways in locating or selecting justifying-spaces.

If the line, including its separators, should be too long, then the point 136 would contact with the bar 111 at the left of the pivot 110, which case would be indicated on the diagram Fig. 38 by the triangles $m\ t'\ u'$ proportional to the triangle $m\ r\ n$. The distance $m\ t'$ indicates a minus quantity or a quantity required to be subtracted from the width of the separator to obtain the thickness of the justifying-space.

The shortage of the line divided by the number of intervals between words gives an integral quotient, which quotient is equal to the size of the space selected by the main computing devices heretofore described. In this division there is usually a remainder. The number of units in the remainder is of course less than the number of word-spaces, and it is distributed among as many word-spaces as there are units. I will describe what I have termed the "difference devices," which are employed to measure the remainder and effect the distribution of the remainder among the proper number of word intervals by readjusting the spacing devices during the process of spacing a line to cause them to select and insert spaces differing by a unit from those inserted at the beginning of a line. These devices constitute properly an averaging mechanism by which the quotient and remainder of the division of the line shortage by the number of spaces is distributed, so that the space-selecting mechanism is caused to select spaces of the same or varying sizes, as may be necessary, to justify the line.

In the first process of measuring the type-line the position of the blade 112 as it practically rests upon the type-line and the angle of inclination of the computing-bar 111 as it is inclined according to the number of spaces required will in all probability locate the point 136 in such position that the pawl-point 413 will rest between two of the space index-teeth 416, as previously intimated. The index-teeth 416 simply designate the locations, or rather the sizes, of the preconstructed space values with which the machine is provided, while the location of the gage-point 136, and the consequent position at which the pawl-point 413 is located relative to said teeth, indicate the average or normal space values which are ascertained by the division of the line shortage by the number of spaces needed and also the size of a space which, if available, would accurately justify the line.

The difference devices determine the distance between the position first assumed by the pawl-point 413 and the position of the neighboring tooth 416. The machine at this time returns the block 136 until said pawl-point is intercepted by the next tooth 416 and the amount of which backward movement is measured by the wedge 311. Upon determining the amount of this movement, or, in other words, the number of units which in this case corresponds to the remainder in simple division, suitable mechanism is employed to rejustify, as it were, this difference. The operation brought about as the result of this second computation causes in this particular construction the space-selecting device to shift positions, and the final justification of the line is accomplished by the employment of as many space units of a larger size as there are units in the remainder, thereby utilizing two neighboring sizes of spaces.

By means of the peculiar clutch mechanism employed in this machine I am able to operate said machine with the minimum amount of wear, since the two main divisions—viz., the word and the line operative members—are actuated only at such times as required for the performance of their work. By making use of correlative word and line clutches dependent in a measure upon each other for their action under certain time limits it is possible to bring about the results desired. During the manipulation of one line of type the clutches set in operation both of the aforesaid main divisions at the start, then discontinue the operation of one of the divisions, next reëngage said last-mentioned division, and finally disconnect the operative parts altogether from the power. The word-clutch comprises a ratchet device directly connected with the power-transmitter, and the line-clutch embraces a secondary ratchet device interposed between the first and the line mechanism, both being initially dependent upon the action of a type-setter key and finally upon the revolution of a line-cam, while intermediately the line-clutch is subordinate to the word-clutch.

The shaft 610 is suitably journaled in the lower part of the frame A at the rear of the machine, and the shaft 622 is similarly mounted above said first-mentioned shaft, passing through the case C. The shaft 610 has the ratchet-wheel 643 at one end and the driving-pulley 601 at the other, both being fast to said shaft, Figs. 1, 2, and 21. Said shaft also carries the loose sleeves 603 and 701, the former having the large gear 645 rigidly attached to its right end and the ratchet-disk 646 similarly connected to the left end, and the latter is provided with the clutch-disk 712, substantially contiguous with said ratchet-disk, and the small gear 703 at the opposite end. The shaft 622 has the loose sleeves 600 and 700 thereon, the former or word-sleeve being equipped with the cams which operate the word mechanism and the latter or line-sleeve equipped with the line-mechanism-operating cams. The small gear 602, fast to the right end of the sleeve 600, meshes with the gear 645 and revolves with about twice the speed of the latter. The large gear 702, fast to the left end of the sleeve 700, meshes with the gear 703 and revolves only about one-quarter as fast as the word-gear 602. This difference in speed between the word and line actuating members is provided for two reasons—first, because better results are obtained by running the line mechanism at a moderate rate of speed, and, secondly, to give the word mechanism time for the performance of its more numerous motions as compared with said line mechanism.

The pawls 647 647 are pivoted to the right-hand face of the gear 645 opposite each other and have their engaging ends tensioned toward the ratchet-wheel 643 by means of the spring-actuated pins 648 in the lugs 649 on said gear, Figs. 1 and 2. The cam-arm 650 is pivoted at 651 to the box C and has the tripping-pin 652 extending to the left from its lower terminal. The lower end of the arm 650 operates in a slot in the front end of the frame detent-bracket 653, the opposite end of which is provided with a tripping-ear 654, projecting to the left, Figs. 2 and 15. The spring 661, attached at one end to the arm 650 and at the other to the side of the case C, draws said arm to the left. The rocker-arm 655 on the shaft 656 engages the cam-surface of the arm 650, while the rocker-arm 657 on the same shaft is connected to the arm 167 by the link 658. The spring 660 between the arm 655 and the bearing 651 tensions said arm upward. The shaft 656 is mounted in front of the case C. The arm 732 is also rigidly connected with the shaft 656, Figs. 1, 2, 15, and 16, and has the roller 733 bearing on the periphery of the line-cam 734 under the influence of the spring 660.

The disk 646 is provided with the two ratchet-teeth 659 opposite each other and in the path of the pawl 713, Figs. 1 and 2, on the right face of the disk 712, the point of which is normally pressed against the periphery of said disk 646 by the spring 714, also secured at one end to said face. The pin 715 extends to the left through a slot in the disk 712 and is arranged to be engaged by the shoe 716 on the lower end of the rocker-arm 718. The shaft 727 is journaled beneath the cases B and C and has the arm 718 fast to its rear end and the arm 728 fast to its front end. The pin 731 projects forward from the left-hand end of the arm 728 between the lower edge of the case B and the pin 151 on the right side of the bar 117 near the base. The spring 280, which tends to draw up the arm 282, also actuates the two pins 731 and 151 into contact, since said arm is rigid with the shaft 727, Figs. 1 and 19.

The word and line clutches just described are operated in the following manner: When the complete unjustified line of type has been erected in the receiving-channel 121, the operator presses the proper key on the type-setter to vibrate the arm 167, and thereby causes the rack 128 to locate the last-depressed ratchet-bar 130 beneath the bar 117 and the arm 655 to simultaneously act upon the cam-arm 650 to the extent of removing the pin 652 from the path of the pawl 647. The forward pawl 647 at once locks the gear 645 to the revolving ratchet-wheel 643 and sets the word-sleeve 600 in motion. During the revolution of the gear 645 both pawls 647 engage the wheel 643, except when passing the ear 654, when one of them is necessarily disengaged thereby. Since the line-clutch was in operation at the time the word-clutch was thrown out, as appears below, and the bar 117 is in its highest position at this time, the shoe 716 is held by the connecting parts out of the path of the pin 715, and the pawl 713 is in engagement with one of the disk teeth 659. The disk 646 has been set in motion by the word-clutch and revolves the disk 712 and through intermeshing and connecting members the line-sleeve 700. Both the line and word mechanisms continue to operate until the bar 117 is released, as elsewhere explained, and drops onto the adjacent ratchet-bar 130, when the spring 280 and the arm 282 cause the shoe 716 to be thrust into the path of the pin 715 and disengage the pawl 713 from the disk 646 when said pin arrives at said shoe, thereby throwing out or stopping the line movement. The groove 609 in the word-cam 623 actuates the arm 626 through intervening connections after the measurement of the line takes place, and the line-clutch escapement on the case B again raises the bar 117 and sets the line mechanism in operation. The rotation of the cam 734 is so timed that the roller 733 now enters a depression in the periphery in said cam, Fig. 2, under the influence of the spring 660 and elevates the arm 655. The raising of the arm 655 allows the arm 650 to swing to the left and thrust the pin 652 into the path of the pawls 647, the nearer of said pawls riding onto said pin and the opposite one onto the ear 654, thereby disengaging both the word and line mechanisms from the continuously-revolving ratchet-wheel 643. Since the pin 652 and the ear 654 are opposite each other, it will be seen that both pawls 647 must be forced out of contact with the teeth on the wheel 643 at the same time, Figs. 1 and 2. It will be understood that as the line-sleeve 700, with its cams, revolves only about one-half as fast as the clutch-disk 646 it is possible for the former to make nearly or quite a quarter-turn before the pin 715 rides onto the shoe 716 after the latter has been actuated into the path of said pin and before the line mechanism is stopped.

After the type-line being acted upon has been measured and transferred by the channel 182 into operative position with the space mechanism the next step is to introduce said line into the cut-off channel 521 at intervals corresponding to the number of words contained therein. This operation is performed by a reciprocating member intermittently acting upon the type-line in the channel 182 at the time the cut-off channel 521 alines with said channel 182. The channel 182 is large enough to accommodate both the type 121ª and the separators 152, allowing them to slide freely therein.

The word-depresser rod 500, Figs. 1, 2, and 15, slides through an opening in the table 174 and in the bracket 501, extending forward from the case C. The rod 500 is situated adjacent to the channel 182 when the latter is in its lateral position, and said rod has the collar 502 rigidly attached thereto beneath the table 174. The collar 502 is connected with the operating-arm 632 by the rod 631, and said arm is pivoted to the frame at 633. The spring 625, extending from the arm 632 to the frame, tends constantly to draw said arm downward with the rod 500. The arm 632 is provided with the boss 624, which bears upon the arm 628, and said arms are constantly oscillated during the operation of the word mechanism by the roller 630 in the cam-groove 609, Figs. 1, 2, 18, and 20. The ratchet-sleeve 503, having the teeth 504, is mounted on the top of the rod 500, and a slight rotary motion between said sleeve and rod is provided for by means of the slot 506 in the former and the pin 505, extending from the latter into said slot. The spring 507, encircling the rod 500 below the sleeve 503, has its upper end attached to said sleeve and its lower end to said rod. This spring normally holds the sleeve 503 with its teeth 504 pointing directly to the left, but yields sufficiently when said teeth are struck by the swinging channel 182 to allow said sleeve to turn aside as far as the pin 505 and slot 506 will permit.

In operation if the hook 217 on the word-slide plate 214 does not at first engage one of the teeth 504 said teeth are turned aside, as stated, until the rising or falling of the sleeve 503 brings the same into registering position with said hook, when the spring 507 swings said sleeve forward again and completes the engagement. The plate 214 is now drawn down through the action of the spring 625 and intervening parts, forcing the type-line in the channel 182 beneath the slide 213 downward into the cut-off channel 521 below. When the rod 500 is elevated against the spring 625, the teeth 504 click past the hook 217 and make a new engagement therewith. The downward return of said rod depresses still more of said type-line onto the friction-block 201 in said cut-off channel, and so this intermittent movement of the line continues until the first separator 152, after passing through the opening 181 into the slot 472, encounters the top of said channel. The line is checked in its downward passage by said separator, and the engaging tooth 504 suspends the sleeve 503 and attached members from the hook 217 if the rod 500 is at the upper end of its travel, or the teeth 504 move inoperatively up and down against said hook if said line is stopped while said rod is below its highest limit of stroke. As shown in Fig. 32, each of the separators 152 has a body as long as the type and two prongs extending at each end. The prongs at one end form a fork extending beyond the feet of the type and the prongs at the other end form a fork extending beyond the type-faces. These separators permit the type to be alined by ribs or blades 183ˣ 183ʸ, which enter the forks, as shown in Figs. 15 and 26, while the prongs serve to engage stops to enable the words to be separated for the purpose of introducing the justifying-spaces, as will be hereinafter explained. As soon as the impeding-separator has been removed by the bottom-plate extension 471, which also serves as a floor for the upper portion of the line while the channel 521 moves to the rear to receive the appropriate spaces for the word last depressed and back again, and said extension alines its slot with the channels, the teeth 504 again act upon said line in the channel 182 and depress another word into said channel 521, when a repetition of the above described action takes place. These movements continue until the last word in the upper channel has been forced into the lower channel by the slide 213, which is itself too wide to enter said lower channel. The slide 213 is next raised clear of the extension 471 and the track 170, and the line mechanism proceeds to swing the channel 182 into its forward position and to actuate the channel 521 into operative relation with the galley-rule blade 538 for the purpose of depositing the justified type-line on the galley $b$. The slide 213 is elevated by an upstroke of the rod 500, which engages the projection 219 on the upper part of the front edge of the plate 214 through the medium of the pin 508 at the lower end of the sleeve 503, Figs. 1, 2, 26, and 27.

The elements in this machine for actually eliminating the separators from the type-line and replacing them with appropriate spaces comprise the space-selector and the space-collector with their attendant and coöperative members. The space-selector consists of automatic means for appropriating from a reservoir the spaces necessary to justify a given line of type, as determined by the measuring devices, in readiness for delivery to the space-collector. A space-plunger delivers the spaces selected to the space-collector, which proceeds to insert them in said line after removing the separators therein. This collector, after receiving the spaces from the selector, piles them up in readiness or final disposition. The space-selector consists, essentially, of a series of changeable forms and means for making the change therein, and the space-collector combines a plurality of space-receiving members, each located adjacent to its corresponding space-channel and adjustable until all of said members are brought into coincident relation with each other, with suitable actuating and coacting parts. These two principal spacing devices are used in connection with the line measuring and transferring channel and the word-cut-off channel. It will be understood that the space-reservoir and other space members may be arranged for a greater or less number of different space-sizes than herein shown and described.

The rear end of the space-value-locating rod 434 is pivotally attached to the connecting-rod 440, which is similarly attached to the locating-arm 448, rigid on the shaft 449, having its bearings in the case C, said case being securely fastened to the frame A and inclosing much of the gear, cam, and clutch mechanism. The rod 440 is pivoted to the arm 448 between the pivotal point 449 and its front terminal, to which latter the arm 451 is pivoted. The arm 451 is rigidly attached to the rear end of the space-selecting rack 452, which is reciprocally located in the bed 454, projecting to the right from the frame. The rack 452 is provided with a series of depressions 455, arranged in longitudinal rows corresponding in number to the number of space-channels 123 and varying in depth to agree with the thickness of one, two, or more spaces contained in their respective space-channels. Referring to Fig. 24, the first section of the rack is provided with depressions $4^x$ for selecting justifying-spaces of four units and depressions $8^x$ for selecting justifying-spaces of eight units. The next section of the rack is provided with depressions $5^x$ for selecting five-unit spaces and $10^x$ for selecting ten-unit spaces. The next section is provided with depressions $6^x$ and $12^x$ for selecting six and twelve unit spaces, and the last section of the rack is provided with depressions $7^x$ and $14^x$ for selecting seven and fourteen unit spaces. It will be seen that by using combinations of these depressions in the rack combinations of spaces of any desired value may be obtained. Of course the unit of value may be changed and any other unit substituted. The space-reservoir 169 is provided with the four channels 123, adapted to contain an equal number of different sizes of spaces. Said reservoir is securely attached to the upper part of the frame A in the rear and to the left of the receiving-galley $b$. The selecting-forms 400 are situated between the reservoir 169 and the rack 452 in the bracket 401, each form being directly below one of the channels 123 and having a foot 403, capable of registering with its adjacent row of depressions in the rack 452. The upper terminal of each of said forms projects to the right and has the slot 404 to accommodate the registering-blade 407 of the space-plunger 409. The forms 400 are tensioned downward by the springs 424 and are raised into their most elevated positions against said springs by the rocker-arm 425, Fig. 1, pivoted at 427 to the frame and having its roller 428 bearing on the cam 613 on the sleeve 600. The upper left terminal of the rocker-arm 425 has the rearwardly-extending pin 429, which operates in the notches 430 in the left edge of the forms 400, said pin bearing on the top of the notches and forcing said forms against the base of the reservoir 169 when the projection of the cam 613 encounters the roller 428, the feet 403 just clearing the high surface of the rack 452. The low part of said cam causes the pin 429 to move to the bottom of the notches 430, and thus permits said forms to be brought by the springs 424 into operative relation with the rack 452, said notches being wide enough to permit of the movement, Figs. 1, 2, 33, and 34. The lug 490 on the right-hand edge of the arm 425 has the forwardly-extending projection 491, which passes through the hole 492 in the frame. The locking-arm 281 is pivoted at 283 through its slot 284 to the frame, and the lower end of said arm is pivotally connected to the operating-arm 282, Figs. 1 and 2. The arm 282 is upwardly tensioned by the spring 280, extending therefrom to the frame, and said arm is operated against said spring by the clutch mechanism elsewhere described. When the arm 281 is raised by the arm 282 as far as the slot 284 will permit, the engaging upper end of said arm 281 presents no obstruction to the projection 491, and the arm 425 is free to rock for the purpose of elevating and permitting the depression of the forms 400, which supply the spaces to the space-collector for each word; but when the justification of the line is complete and the clutch throws the line mechanism into operation the engaging end of the arm 281 is depressed with said arm back of the projection 491, and the arm 425 is thereby locked, thus cutting off the supply of spaces. The arm 425 is locked at the left end of its travel, which brings the forms 400 tight against the base of the channels 123. When the line mechanism is thrown out, the arm 281 releases the arm 425.

The shaft 449 is, under the influence of the spring 453, attached to a depending extension of the arm 448 and the case C, and the cam 730 on the line-sleeve 700 through the medium of the arm 457, having the roller 458, Figs. 2 and 16. The spring 453 moves the rod 434 forward until it is checked in the manner hereinbefore fully described, thereby locating the appropriate rack-notches 455 below the channels 123. The forms 400 being now released are depressed by the springs 424, and such of them as have the depression 455 below enter the same, carrying down with them the number of spaces from said channel which the measuring devices have predetermined to be necessary to insert between the words for justifying the type-line. These spaces are removed and inserted in the type-line by the space-plunger and space-collector, the rack 452 retaining its present position until the space-values thus selected have been introduced into said line in place of the separators 152. After the line has been justified the rack 452 and the rod 434 are free to be moved by the action of the cam 730.

The space-collecting carriage 431 is mounted on suitable ways in the table 174 and is reciprocated by the arm 461, pivoted at 462 to the case C, the upper end of said arm being pivotally connected with said carriage by the link 463 and the lower end having the roller 464 extending into the cam-groove 608, Fig. 2. The carriage 431 incloses the pile of space-collecting members or plates 465, which are actuated in sequence as said carriage is reciprocated by the pin 466, extending downward through said plates from the arm 467, pivoted at 468 to the rear of said carriage, said arm being on top of the latter. The plates or collectors 465 differ from each other essentially only in the shape of the cam-slots 469, with one of which and the space-slot 470 each plate is provided, and in the separator-knock-out extension 471, having therein the separator-slot 472, possessed by the bottom plate alone. The size and shape of each space-slot 470 conforms to those of a space, and the configurations of the cam-slots 469 are such as to enable the collectors 465 to be assembled at the end of the forward travel of the carriage 431 with their space-slots in perfect alinement by the action of the pin 466, which passes through said cam-slots into the cam-slot 473 in the table 174. The four space-slots 470 are adjacent to the channels 123 when the plates 465 are dispersed to their rear positions, the top surface of each of said plates being on a level with the base of its corresponding channel, the bottom of the reservoir 169 being stepped for this purpose. The space-clamp 474 is supported by the standard 475, which is securely affixed to the top of the upper plate 465. The clamp-stem 476 extends through a shoulder at the top of the standard 475, and the spring 477 is introduced between said clamp and shoulder to tension the former downward. Said clamp is guided in its movement by said stem and a screw passing through the clamp-slot 478 into the standard 475. The clamp 474 has the left shoulder 479 and the right shoulder 480, the latter resting on the ear 481 when the carriage 431 is at the rear end of its travel. The ear 481 projects to the left from the lug 482, said lug being attached to the table 174. Pivoted to the lug 482 is the downwardly-tensioned finger 483, having the left offset 484 in the path of the shoulder 480. The clamping-arm 485 is pivoted at 486 to the frame, and its right end is adapted to bear on the shoulder 479. Projecting back from the left end of the arm 485 is the pin 487, which enters the slot 488 in the cam-plate 489, Figs. 1, 15, and 26. Said plate is rigid with the plunger 409 and travels therewith. The space-plunger 409, having the blades 407 corresponding in number with the forms 400 and the channels 123, is reciprocated right and left below said channels by the arm 405, pivoted at 408 to the frame, and having the rollers 410 in contact with the cam 613 on the sleeve 600, the upper end of said arm being pivotally connected with the left terminal of said plunger. The plunger 409 operates in suitable ways on the table 174.

The word-cut-off channel 521, Figs. 2, 27, 33, 34, is located immediately below the plate extension 471 at the front end of the pusher-block 523, which travels in the ways 520, and said channel is provided with the friction-block 201. The block 523 is reciprocated through the medium of the arm 524, pivoted at 525 to the case C, the link 526 connecting said arm at the top with said block and the cam-groove 797 and 609 in the cam 623, in which the roller 527 operates. The roller 527 is thrown from the cam-groove 609 into the groove 797 when the line mechanism is at work by means of the switch-block 634, Figs. 18, 19, and 20, pivoted at 635 to the left side of the cam 623 and operated in the following manner: The block 634 is tensioned against the stop-pin 636 by the spring 637 and normally confines the roller 527 to the inside groove. The pin 638 extends from the left side of said switch-block, near the free end thereof, and the spring 639 normally forces the cam-plate 640 a little beyond the path of said pin. The plate 640 is pivoted at 641 to the arm 524, and the spring 637, which is attached to said arm, forces said plate to the left. The finger 642 extends upward from the top of the cam-plate 640 and over to the left until its free terminal lies in the path of the cam 717. At the proper instant in the revolution of the cam 623 the cam 643 encounters the finger 642 and swings the plate 640 against the resiliency of the spring 637 into the path of the pin 638, which carries the block 634 against the resiliency of its spring until said block strikes the stop-pin 644, thereby closing the entrance to the groove 609 and switching the roller 527 into the groove 797. As soon as the pin 638 clears the plate 640 the spring 639 returns the block 634 to its former position across the opening to the groove 607, the cam 643 having meanwhile cleared the finger 642 and the spring 637 actuated said plate out of the way of said pin. The projection 621 on the arm 628 lies in the path of the pin 638 and positively completes the work of the spring 639. The roller 527 is next deflected into the groove 609.

The friction-block 201 has the receiving-blade 202 extending upward therefrom into the channel 521. The blade 202 is adapted to enter the slot 181 in the track 170 when the channel 521 is in position to receive the line in the channel 182, now located directly above.

Assuming that the spacing devices occupy the position shown in Figs. 20 and 27, in which the transferring-channel 182 and the cut-off channel 521 are in alinement above and below the track-opening 181, respectively, Fig. 27, and the space-selector is located in position by the rod 434 for receiving the desired number of spaces from the channels 123 to insert between each pair of words in a given line, as previously described, the operation of the space-collector and attendant parts is as follows: The type-line in the channel 182 is depressed by means hereinafter described until the first or bottom word which rests upon the blade 202 has passed through the alined track-opening 181 and the slot 472 into the channel 521 and the first separator 152 enters said slot, where it checks further downward movement of said line by coming in contact with the top of said channel 521. The separator 152 being longer than the type cannot enter the channel 521, which is only large enough to accommodate said type. The manner of operating the friction-block 201 is elsewhere explained, and it will be sufficient to state here that said block is forced farther and farther down as each succeeding word is introduced into the cut-off channel, but said block moves downward under each impetus only enough to allow the upper end of the line contained in said channel to clear the slot 472. The arm 405 drives the plunger 409 to the right, and the blades 407 propel the selected spaces on the forms 400 into their respective slots 470 in the collectors 465 from beneath the channels 123, the stop 548 across said channels at the bottom preventing more spaces being removed therefrom by the action of said blades than have been selected. The arm 461 being actuated by its cam now moves the carriage 431 forward, carrying with it the plates 465, which are further reciprocated one upon the other sequentially by the pin 466 in the cam-slots 469 until the slots 470 aline with each other. The forward movement of the carriage 431 has carried the extension-slot 472 with its engaged separator in front of the channels 182 and 521 and dropped said separator into a suitable funnel, (not shown,) whence it is conveyed out of the way. The extension 471 closes the opening in the track 170 at this time and the line in the channel 182 rests thereon. The roller 527 in the cam-groove 609 causes the arm 524 to slide the block 523 and the channel 521 to the rear until the latter is in alinement with the slots 470 and the parts stand as shown in Fig. 33.

As the upper collector 465 moves forward the space-clamp 474 is carried with it, and the shoulder 480 slips from the ear 481 upon the space or spaces contained below said clamp in the slot 470 under the force of the spring 477 and beneath the spring-actuated finger 483, which now rests upon said shoulder. The sequential movement of the plates 465, whereby the selected spaces are piled up in the slots 470 as fast as they aline, carries the clamp 474 forward in contiguity with the accumulating pile of spaces until the channel 521 is reached and it is necessary to deposit said pile on top of the word immediately below. The instant the carriage 431 arrives at the forward end of its travel the plunger 409 is reciprocated by its cam to the left, and the attached cam-plate 489 depresses the right end of the arm 485 onto the space-clamp shoulder 479, thereby forcing downward the clamp 474 and the contiguous spaces. The clamp 474 is depressed until it rests upon the top of the channel 521, and the spaces are deposited upon the top of the line in said channel, the base of said clamp being longer than the opening in the top of said channel, which prevents the clamp from entering the same. The channel 521 is now ready to be actuated forward again for another word from the channel 182, and the cam-plate 489 being conveyed to the right by the plunger 409 releases the arm 485. The clamp 474 having been carried forward of the finger 483, the front end of said finger drops below the shoulder 480, which rides on top of the same, when said clamp is returned to its starting-point and slides from the offset 484 onto the ear 481. The clamp 478 in riding on the finger 483 is elevated clear of the slots 470. The return travel of the carriage 431 disperses the plates 465 in inverse order to that in which they were assembled, with their slots 470 alining horizontally with the channels 123 in readiness to receive the spaces for the next word. The channels 182 and 521 and the slot 472 are again in position for a repetition of the operation of the space-collector, as previously explained, and this operation is repeated until all of the separators in the line being acted upon by these members have been expelled and their places filled with spaces. When the line is justified, the selecting device is changed in accordance with the requirements for the new type-line.

The length of travel of the block 523 and the cut-off channel 521 for the purpose of receiving the words from the channel 182 and the spaces from the space-collector is determined by the cam-groove 609; but when the work of justifying the line is complete and it becomes necessary to deposit the same in the galley b the line mechanism is set into motion and the switch-block 634 changes position to throw the roller 527 into the groove 797, which determines the travel of the cut-off channel for the purpose above specified.

I will next describe the galley devices, which consist of the means or mechanism employed for transferring the justified line of type from the cut-off channel onto the galley b, in doing which said channel is collapsed and transformed into a galley line-pusher. A reciprocating galley-rule blade coöperating with the movable wall of the channel 521 is made use of in this construction in conjunction with the remaining channel-wall, said walls operating in right-angular reciprocal relation to each other.

The cut-off channel 521, Figs. 33 to 37, inclusive, consists of the rear wall or pusher-block 523, the front wall or movable plate 542, and the carrier 540, which constitutes the bottom of said channel and furnishes a support for said plate. That part of the block 523 which extends to the rear of the channel 521 slides in the ways 520, as hereinbefore described, and the contiguous portion of the carrier 540 moves with it, provision being made, however, for some independent movement between the two at the proper time through the medium of the pin 543, extending from said carrier into the slot 544 in said block. The plate 542 is provided with the ways 528, which receive the depending tongue 529 of the carrier 542, and said plate slides thereon at right angles to the movement imparted to it by the block 523 and said carrier. When the plate 542 is in its raised position to form a wall of the channel 521, it locks the block 523 and the carrier 540 against independent movement with the pin 543 against the front end of the slot 544, and said plate is secured in position by the ways 520, the right-hand or lower edge thereof bearing on said ways with the tongue 529 extending between the same. The plate 542 is provided with the hole 530. In front of the plate 542 and adjacent to the galley b is located the galley-rule blade 538, mounted in the slideway 531 and provided with the fixed pin 545, registering with the plate-hole 530. The rod 537 is pivoted at 532 to the lower part of the blade 538 and connects with the top of the operating-arm 536, Figs. 1, 2, and 38. The arm 536 is pivoted at 533 to the frame and has the rollers 534 in operative relation with the line-cam 734.

In operation when the completely-justified line of type in the channel 521 is ready to be deposited in the galley b the cam 717 causes the roller 527 to be switched into the cam-groove 797 and the plate 542 is actuated into contiguity with the blade 538, the pin 545 being received into the hole 530 in said plate. The cam 734 now acts upon the arm 536, and the blade 538 is drawn to the left with the plate 542 until the right edges of said blade and plate are flush with the bottom of the galley b, said plate sliding on the tongue 529. At this instant the block 523 is forced forward still farther by the continued rotation of the groove 797 past the carrier 540, the plate 542, and the blade 538, and deposits the type-line in the galley b. To facilitate this last action, the cam-finger 535, fast on the rear end of the galley b and depending from the lower edge thereof, is employed, with the pin 547 in the upper part of the right face of the friction-block 201. When the block 201 is depressed to its lowest position by the type-line in the channel 521, the pin 547 is in the path of the finger 535, Figs. 33 and 34, and the former is brought into contact with the under cam edge of the latter at the time the block 523 is actuated in conjunction with the galley b. The top of the blade 202 is dovetailed or notched to register with the abutting end of the lower side of said galley, which is similarly formed, and as soon as the line rests upon said side the finger 535 depresses the block 201, thereby withdrawing the support of said blade, so that when the latter is drawn back it will not disturb the type. The continuation of the rotation of the groove 797 and the cam 734 restores the previously-collapsed channel 521 by first withdrawing the block 523 from the path of the plate 542 and the blade 538 and next returning the two latter to their former position, said blade rising in time to close the end of the galley in the rear of the last typeline deposited thereon. The friction-block 154, Fig. 2, retains the lines on the galley b in a compact column. The roller 527 meanwhile returns to the groove 609 and discontinues further line action of the channel 521 at this time.

For the purpose of raising the block 201 and the blade 202 in readiness for a new line the loose sleeve 739 on the rod 500 and provided at the top with the hook 740 is made use of, Figs. 1, 2, and 15. The hook 740 extends to the left from the sleeve 739 beneath the block 201. The sleeve 739 is reciprocated on the rod 500 by means of the arm 741, pivoted at 742 to the frame, the rod 743 connecting said sleeve with the right-hand end of said arm and the line-cam 744, against which the arm-roller 745 bears. After the channel 521 has been restored the cam 744 causes the sleeve 739 to rise on the rod 500 with the hook 740 under the block 201 and elevate the latter into its highest position, and then said sleeve is returned with its hook out of the way of said block. The final action of my machine inserts a lead or rule into the column on the galley b, if desired, and the performance takes place upon the return of the blade 538 to its right-hand position. Means are also provided for preventing the insertion of a rule into the column by the action of the blade 538, when such a negative result is wanted, by introducing a rule-cut-out plate between the rules and the rule-removing member. A longitudinally-movable rule-feed ratchet-rod is used in connection with this rule-inserting device, as will presently be explained.

The rule-receptacle 570, Figs. 1 and 38, is located back of or below the bottom of the galley b, in which is the package of separating-rules 153, pressed together by the friction-block 571. The two latches 573 are inserted in the small pockets 569 in the rear end of the plates forming the bottom of said galley and the roof of said receptacle. More or less than two latches 573 may be employed in this connection. The latch-stems 568 are encircled by the spiral springs 574, which act between the front ends of said pockets and the front faces of the latches 573 to tension the latter backward into contact with the blade 538. The right side or top of each latch 573 is flush with the corresponding surface of the galley-bottom and its opposite side is beveled. The blade 538 forms the rear end of the receptacle 570 and has the offset or shoulder 575 in its right terminal also flush with the right or upper surface of said galley-bottom when said blade is at the right-hand end of its stroke, and of a depth equal to the thickness of a rule. When the blade 538 is withdrawn to the left, the springs 574 force the latches 573 beneath the adjacent rule 153, and the block 571 forces the rear rule in the receptacle 570 against said blade in the manner presently to be described, with the left or bottom edge of said rule on the shoulder 575. After the type-line has been shifted onto the galley b the blade 538 returns, as before explained, carrying with it the rule on the shoulder 575, forcing forward the latches 573 and bringing said rule into position at the rear end of the column. The block 571 is securely attached to the rear end of the arm 572, which is integral with the traveling pusher-hub 576 on the ratchet-rod 577 and operates in the slot 590 in the bottom of the receptacle 570. The hub 576 is provided with the pawl 578, Fig. 39, pivotally attached thereto and having its front end pressed into engagement with the teeth 579 on the rod 577 by the spring 580, the slot 581 being cut in the under side of said hub to receive said pawl. By means of the spring-actuated feed-pawl 578 the hub 576 is operatively engaged by the ratchet-teeth 579 during the rear longitudinal movement of the rod 577 and inoperatively engaged during the reverse motion of said rod, whereby an intermittent reciprocal movement is imparted to said hub. The rod 577 has its slide-bearings in suitable projections on the outside of the receptacle 570. The rod 577 is given a slight longitudinally-reciprocal movement by means of the arm 763, connected to the rear end of the said rod and pivoted at 764 to the frame, with its roller 765 bearing on the cam 766, Fig. 1. The spring 767, interposed between the lower part of the arm 763 and the frame, tensions the roller 765 onto the periphery of the cam 766, which is fast to the left end of the line-sleeve 700. The movement of the rod 577 takes place during the line action, and when said rod is actuated to the rear it causes one of the teeth 579 to engage the feed-pawl 578 of the hub 576 and push the block 571 and the package of rules 153 in the same direction, thereby bringing the rear rule into contiguity with the blade 538 at the proper time to deposit the same on the shoulder 575 in readiness to be carried to the galley b. The return movement of the rod 577 engages another tooth 579, with the pawl 578 in readiness to actuate the next rule into operative relation with the blade 538 and removes the pressure from the package of rules. A repetition of the above-described movements takes place for each line of type, and a succession of actuating engagements follows the friction-block 571 wherever it may be.

To nullify the action of the rule device previously described, the rule-cut-out plate 584 is provided, Fig. 38. This plate has a longitudinal movement at the rear end of the receptacle 570, and the pocket 585 is let into the contiguous face of the blade 538 to receive said plate, the two sliding independent of each other. The front faces of the plate 584 and the blade 538 are flush. The plate 584 is fast on the rear end of the rod 586, Figs. 1 and 38, which extends through the lug 587 at the forward end of the receptacle 570, and said rod is tightly fastened at either end of the slot in said lug in some suitable manner, as by the nut 588 and the set-nut 589, both threaded to the end of said rod on opposite sides of the lug. When it is desired to automatically insert the rules in the column on the galley $b$, the plate 584 is moved to the left until its beveled right edge is on a line with the bottom of the receptacle 570 and secured in that position by the nuts 588 and 589. The blade 538 now engages a rule at each return stroke, the plate 584 being entirely out of the way, since the pocket 585 allows said blade to slide freely over said plate. It will be understood, of course, that the plate 534 is narrower than the length of a rule 153, and consequently not as wide as the blade 538. In order to render inoperative the action of the blade 538 so far as the rules in the receptacle 570 are concerned, loosen the nuts 588 and 589, push the plate 584 by means of the rod 586 to the right in the pocket 585 across the end of said receptacle, and again tighten said nuts. Now the plate holds the rules against the action of the ratchet-rod 577 and intervening parts, and the blade 538 operates without receiving a rule upon the shoulder 575.

While the machine shown as embodying the invention is adapted for handling ordinary type and the invention is especially intended for such use, it will be understood that the invention is not limited to machines for justifying such ordinary type, but may be applied also in justifying type, matrices, or the like of any suitable material, and the word "type" is used in this specification and the claims in this broad sense. Certain broad features of the invention also are applicable not only in machines for justifying composed lines of type, matrices, and the like, but for all kinds of composing-machines, and therefore are claimed broadly in justifying mechanism.

The calculating and space-determining devices in the machine illustrated and described herein are combined with a space-magazine and devices for supplying and inserting ready-made spaces, and certain of the claims are limited to combinations including such space-magazine; but it will be understood that the features defined by the broader claims may be used also in machines in which the justifying-spaces are provided otherwise than by ready-made spaces, suitable space forming or supplying and inserting devices being combined with the calculating devices for this purpose.

What I claim as my invention, and desire to secure by Letters Patent, is—

1. In a type-justifying machine, a word-space-counting device comprising a series of toothed bars or elements, and means for actuating the same in succession or rotation to represent the numbers of word-spaces in successive lines of type, for the purpose set forth.

2. In a type-justifying machine, a word-space-counting device comprising a rotatable drum, a series of toothed bars carried by said drum and having a reciprocating movement thereon, and means for setting said bars successively to represent the numbers of word-spaces in successive lines of type, for the purpose set forth.

3. In a type-justifying machine, a word-space-counting device comprising a series of toothed bars or elements, a carrier therefor, a space-key, and means for bringing said bars or elements successively under the influence of said space-key whereby said bars may be set in accordance with the numbers of word-spaces in successive lines of type, for the purpose set forth.

4. In a type-justifying machine, a word-space-counting device comprising a rotatable drum, a series of bars mounted to reciprocate on said drum, means for setting said bars successively in accordance with the numbers of word-spaces in successive lines of type, means for locking each bar temporarily after it is set and until it has been utilized in the justification of the line, and means for restoring said bar to its initial position, for the purpose set forth.

5. In a type-justifying machine, a word-space-counting device comprising a rotatable drum, means for rotating the same intermittently, a series of toothed bars mounted to slide in said drum, springs for moving said bars in one direction, a pawl operated by a space-key and adapted to move said toothed bars against said springs, and a locking-table arranged to engage the toothed bars successively and hold them against return to their initial positions until they have been used in the justifying operation.

6. In a type-justifying machine, computing devices comprising a bar or element which is adjustable for each line in accordance with the number of word-spaces therein, in combination with an intermittently-movable carrier, a series of bars arranged to slide on said carrier, a space-key and connections for setting said bars successively to represent the numbers of word-spaces in successive lines, and means for holding said bars in operative position temporarily and until they have served to actuate the computing device.

7. In a type-justifying machine, the combination of a vertically-arranged receiving-channel, a vertically-arranged measuring-channel capable of lateral movement, means for elevating a type-line from the receiving-channel into the measuring-channel, and means for moving the measuring-channel laterally to and from the receiving-channel, substantially as described.

8. In a type-justifying machine, the combination with a vertically-arranged receiving-channel, and a vertically-arranged measuring-channel capable of lateral movement, of a lifting-block having prongs adapted to enter the receiving-channel and elevate the type-line therein, means for raising said block, and means for moving the measuring-channel laterally to and from the receiving-channel.

9. In a type-justifying machine, the combination of a receiving-channel, a line-separator knock-off block movable laterally to and from the end of said receiving-channel, means for raising the line to bring the line-separator into engagement with said knock-off block, and means for moving said block laterally to remove the separator from the line.

10. In a type-justifying machine, the combination of a receiving-channel, a knock-off block movable into line with said channel and having a recess to receive the line-separator, means for moving the line yieldingly to bring the line-separator into engagement with said block, and means for moving said block laterally to remove the line-separator from the line.

11. In a type-justifying machine, the combination of the receiving-channel, the measuring-channel movable laterally into and out of alinement with said receiving-channel, and a knock-off block having a recess to receive a line-separator, said knock-off block being normally in line with the receiving-channel and said measuring-channel being arranged to engage and move said knock-off block as the measuring-channel is brought into alinement with the receiving-channel.

12. In a type-justifying machine, the combination with the receiving-channel, of a movable knock-off block having a recess to receive a line-separator, a spring operating to normally hold said recess in line with the receiving-channel, and means for vibrating the knock-off block to remove the line-separator from the line.

13. In a type-justifying machine, the combination of a receiving-channel, a knock-off block having a recess normally in line with said channel, means for moving the knock-off block laterally to the channel, a line-elevator and a cam and connections for operating said elevator, said cam having a yielding portion to compensate for different lengths of lines, substantially as described.

14. In a type-justifying machine, the combination of a line-measuring gage, spacing devices, and a measuring-channel adapted to hold a line of type, said channel being movable laterally between the measuring-gage and the spacing devices.

15. In a type-justifying machine, the combination of a receiving-channel, a laterally-movable measuring-channel, a line-measuring gage, means for transferring a line to the measuring-channel, means for operating the gage, and means for moving said measuring-channel to carry the line to the spacing devices after it is measured.

16. In a type-justifying machine, the combination of a receiving-channel, a line-measuring gage in line with said channel, a line-measuring channel movable laterally, spacing devices, and means for moving said measuring-channel laterally between the gage and the spacing devices.

17. In a type-justifying machine, in combination with the line-measuring device and the spacing devices, a line measuring and transferring channel arranged to swing in the arc of a circle between the measuring device and the spacing devices, substantially as described.

18. In a type-justifying machine, in combination with the line-measuring device and the spacing devices, a line measuring and transferring channel movable between the measuring device and the spacing devices, means for inserting a line therein in one direction, and means for discharging the line therefrom in the opposite direction.

19. In a type-justifying machine, a line measuring and transferring channel movable between the measuring devices and the spacing devices, a slide therein, means for moving the line into the channel against said slide, and a line-measuring gage arranged to contact with said slide to measure the line.

20. In a type-justifying machine, the combination of the line-measuring bar, the measuring-gage connected with said bar, the line-gage blade, and the wedge intermediate said bar and gage-blade, for the purpose set forth.

21. In a type-justifying machine, the combination of a line-measuring bar, a wedge-block rigidly connected therewith, a line-gage blade, a second wedge-block connected with said gage-blade, and a wedge movably arranged between said wedge-blocks, for the purpose set forth.

22. In a type-justifying machine, the combination of the line-measuring bar, the wedge-block carried by said bar, the line-gage blade, the wedge-block carried by said blade, a wedge, and means for driving said wedge yieldingly between said wedge-blocks.

23. In a type-justifying machine, the combination of the word-counting bar, the pivoted computing-bar, the line-measuring bar, the line-gage blade, the gage-block carried by said blade, the wedge-blocks connected respectively with the line-measuring bar and the blade, and a wedge adapted to be driven between said wedge-blocks, for the purpose set forth.

24. In a type-justifying machine, the combination of the line-measuring bar, the wedge-block carried thereby, a second wedge-block, a line-gage blade connected to said second block and both having a movement parallel with the movement of the line-measuring bar, and a wedge movably mounted between said wedge-blocks, for the purpose set forth.

25. In a type-justifying machine, the combination of the line-gage blade having notches or teeth in its edge, a gage-block arranged to ride on said blade, a pawl carried by the gage-block and arranged to interlock with the said teeth, the pivoted computing-bar, means for moving the gage-block into engagement with said computing-bar, means for returning said block until its pawl engages a tooth of the gage-blade, and a wedge arranged to be moved in proportion to said return movement of the pawl to measure the same, for the purpose set forth.

26. In a type-justifying machine, the combination with the computing-bar, of a line-gage blade, a gage-block mounted to slide thereon, and a locating-rod having a connection with said gage-block whereby the gage-block is moved laterally by said rod and permitted to move vertically with the gage-blade, for the purpose set forth.

27. In a type-justifying machine, the combination with the line-gage blade provided with a series of teeth, of a gage-block having a sliding movement thereon, a pawl on said gage-block adapted to engage said teeth, a pivoted computing-bar, a locating-rod having a connection with said gage-block, and means for moving said rod yieldingly to bring the gage-block into contact with the computing-bar and for returning the gage-block yieldingly until its pawl interlocks with a tooth of the gage-blade, substantially as described.

28. In a type-justifying machine, the combination of the line-gage blade, the gage-block mounted to slide on said blade, the locating-rod, and a pin-and-slot connection between said locating-rod and gage-block whereby the latter is moved longitudinally of the rod but free to move laterally thereof, for the purpose set forth.

29. In a type-justifying machine, the combination of the line-gage blade, the gage-block, means for moving the gage-block yieldingly in one direction, means for returning it yieldingly a limited distance in the opposite direction, and means for moving it positively during the balance of the return movement, for the purpose set forth.

30. In a type-justifying machine, the combination with a pivoted computing-bar, and a line-gage blade of a gage-block movable along said blade, means for moving said block yieldingly during its travel in one direction and during part of its return movement and means for moving said block positively during the remainder of its return movement, for the purpose set forth.

31. In a type-justifying machine, the combination of the computing-bar, the toothed line-gage blade, the gage-block mounted thereon and provided with a dog adapted to engage said teeth, means for reciprocating the gage-block yieldingly in one direction until intercepted by the computing-bar, means for yieldingly returning said block until checked by said dog, and means for releasing the dog and returning said gage-block to its initial position, for the purpose specified.

32. In a type-justifying machine, the combination of a line-gage blade, a gage-block movable thereon, and a series of spring-actuated and cam-actuated members arranged to impart a yielding movement to said block in one direction, and a part yielding and a part positive movement in the opposite direction, for the purpose set forth.

33. In a type-justifying machine, the combination with relatively movable wedge-blocks of an intermediate wedge a spring-actuated member arranged to drive said wedge, and automatic means for returning said wedge to its normal position, for the purpose set forth.

34. In a type-justifying machine, the combination with relatively movable wedge-blocks, of a wedge movable between said blocks and a spring-actuated slide having a pin-and-slot connection with said wedge, for the purpose set forth.

35. In a type-justifying machine, the combination with relatively movable wedge-blocks, of an intermediate wedge, a spring-actuated slide connected to said wedge and arranged to advance the same, and a ratchet and pawls for returning said slide, for the purpose set forth.

36. In a type-justifying machine, the combination of spacing devices, means for setting the same to select a given size of space, and devices for resetting the same to select spaces of a different size, said devices comprising a wedge, a toothed member for driving the wedge, and pawls for returning the wedge, said pawls being actuated each time a justifying-space is inserted.

37. In a type-justifying machine, the combination of spacing devices, means for setting the same to select a given size of space, and devices for resetting the spacing devices to select spaces of a different size, said devices comprising an escapement, a wedge, means for moving the wedge forward and determining said forward movement by the measurement of the line, means for feeding said wedge backward as the spaces are inserted in the line, and connections whereby the return movement of the wedge trips said escapement at the proper time to reset the spacing devices.

38. In a type-justifying machine, the combination with the space-value locating-rod, the ratchet-bar connected thereto, and escapement devices for said ratchet-bar, of the means for tripping said escapement, comprising a wedge adapted to be driven forward in proportion to the remainder to be filled in a line, the feeding device for returning said wedge, and an arm for tripping said escapement during the return movement of the wedge, for the purpose set forth.

39. In a type-justifying machine, the combination of the sleeve 302, the wedge connected to said sleeve, the spring for moving the sleeve in one direction, the ratchet and pawls for moving said sleeve in the opposite direction, and the cam for throwing said pawls out of engagement at the proper time to permit the spring to drive the wedge.

40. In a type-justifying machine, the combination of the space-value locating-rod, the ratchet-bar on said rod, the escapement-pawls coöperating with said ratchet-bar, means for tripping said escapement during the process of spacing a line of type, and a cam for throwing said escapement-pawls out of engagement with the ratchet-bar at the proper time to permit the space-value locating-rod to be set, for the purpose set forth.

41. In a type-justifying machine, the combination of the space-value locating-rod, the ratchet-bar connected therewith, the escape-pawls coöperating with said ratchet-bar, the arm 450 connected to said locating-rod, means for throwing said pawls out of engagement and moving said rod yieldingly forward, and means interposed in the path of said arm to stop the locating-rod in proper position to begin the spacing of a line, said locating-rod being connected to the spacing devices.

42. In a type-justifying machine, means for tripping one or more devices, comprising a plate having cam projections, and means for imparting a combined reciprocating and oscillating movement to said plate.

43. In a type-justifying machine, in combination with a plurality of tripping devices, a cam-plate having a plurality of cam projections, means for reciprocating said plate, and means for directing said plate in different paths during its going and return movement whereby the cams are only operative during their movement in one direction.

44. In a type-justifying machine, the combination of a word-space-registering device, a counting-bar adapted to be adjusted by contact with said device, and a pivoted computing-bar having its free end in engagement with said counting-bar, said computing-bar being adapted to denote by its angle the number of spaces in the line, for the purpose set forth.

45. In a type-justifying machine, the combination of a word-space-registering device, a counting-bar adapted to be adjusted by contact with said device, a computing-bar swinging upon a fixed center and having its free end in engagement with said counting-bar, said computing-bar denoting by its angle the number of word-spaces in the line, a series of teeth on said counting-bar, and a dog arranged to engage said teeth to lock the bar after it has been adjusted for the justification of a line, for the purpose set forth.

46. In a type-justifying machine, the combination of the word-counting devices, the counting-bar adapted to be set by said devices, a pivoted computing-bar having its free end in engagement with the counting-bar, the dog for locking said bar, and a cam-plate arranged to act on said dog and effect the locking of the bar while the spacing devices are being set, for the purpose set forth.

47. In a type-justifying machine, the computing-bar having a swinging movement about a fixed center, a counting-bar having engagement with the free end of the computing-bar, a series of teeth on said counting-bar, a locking-dog coöperating therewith, a second series of teeth on said bar, feed-pawls coöperating therewith, means for disengaging said pawls and dog to permit said counting-bar to move into engagement with the word-spacing devices, and means for reengaging said pawls and operating the same to restore the same to its initial position, for the purpose set forth.

48. In a type-justifying machine, the combination of a reciprocating counting-bar adapted to be set by the word-counting devices, feeding mechanism for restoring said bar to its initial position step by step as the word-spaces are inserted in a line, and a clutch-controlling device constructed and arranged to be operated by said bar as it rises to its initial position to throw the line mechanism into action, for the purpose set forth.

49. In a type-justifying machine, the combination of a counting-bar, means for moving said bar in one direction a distance proportional to the number of word-spaces in the line under justification, means for returning said bar step by step as justifying-spaces are inserted in the line, and a line-mechanism-starting device operated by said counting-bar, for the purpose set forth.

50. In a type-justifying machine, a power-shaft, a word-handling mechanism, a starting-key for throwing the word-handling mechanism into operation, a line-handling mechanism operated by a clutch from the word-handling mechanism, a space-counting bar controlling said clutch, and means operated by the line-handling mechanism for throwing both mechanisms out of action after the justification of a line, for the purpose set forth.

51. In a type-justifying machine, the combination of two alining channels each capable of holding a line of type, a slide in one of said channels, and a reciprocating ratchet-bar operating on said slide and tending to move it intermittently to feed the line word by word into the other channel, for the purpose set forth.

52. In a type-justifying machine, the comnation of a line-transferring channel, a slide in said channel provided with a yielding hook or pawl, a second channel adapted to aline with said transferring-channel, and a reciprocating ratchet-bar adapted to engage said hook and actuate the type-line intermittently from one channel into the other.

53. In a type-justifying machine, the combination of a line-transferring channel having a lateral movement, a word-cut-off channel also having a lateral movement and adapted in one position to aline with the transferring-channel, means for actuating a line of type from the transferring-channel to the word-cut-off channel intermittently, means for intercepting and ejecting the word-separators whereby they are prevented from passing into the cut-off channel, and means for introducing justifying-spaces into the cut-off channel in lieu of said separator.

54. In a type-justifying machine, the combination of a line-receiving channel, a word-cut-off channel, a line-transferring channel movable laterally and adapted to register with the receiving-channel and the cut-off channel at the extremes of its movement, for the purpose set forth.

55. In a type-justifying machine, the combination of a line-receiving channel, a laterally-movable word-cut-off channel, a laterally-movable transferring-channel, means for transferring the line of type to said latter channel from the receiving-channel, means for measuring the line in the transfer-channel, and means for bringing the transfer-channel and the word-cut-off channel into alinement periodically, for the purpose set forth.

56. In a type-justifying machine, the combination with the receiving-channel, and the word-cut-off channel, of the laterally-movable line-transferring channel, and a curved track or floor for supporting the line in said latter channel during its movement.

57. In a type-justifying machine, the combination of a plurality of space-channels, means for ejecting spaces therefrom, a plurality of forms for governing the selection of spaces, automatic means for adjusting said forms to select part of the justifying-spaces for a line, and means for automatically readjusting said forms to select the balance of the spaces for the line, whereby a line of type may be automatically justified with a limited number of space values.

58. In a type-justifying machine, the combination of the space-magazine, the space-ejectors, the movable forms for controlling the selection of justifying-spaces, a space-selecting rack for adjusting said forms, means for setting said rack to select part of the justifying-spaces for a line, and means for resetting said rack to select the balance of the spaces.

59. In a type-justifying machine, the combination of a space-reservoir having a plurality of channels, a space-ejector for each channel, a plurality of selecting-forms arranged to determine by their position the selection of spaces from the several channels, a space-selecting rack for determining the adjustment of said forms, and means for automatically readjusting said rack and forms during the operation of spacing a line of type, for the purpose set forth.

60. In a type-justifying machine, the combination with the space-magazine having a plurality of channels, a plurality of space-ejectors at the lower ends of said channels, a corresponding plurality of selecting-forms arranged to sustain the spaces in the channels and by their elevation to determine the number of spaces to be ejected from each channel, and automatic means for adjusting said forms to select justifying-spaces for a line of type.

61. In a type-justifying machine, the combination with a space-magazine having a plurality of channels, of a series of space-ejecting blades on a common slide, and a series of independently-movable forms having parts adjacent to the ejecting-blades and adapted to sustain the spaces in the channels, said forms being relatively adjustable to determine the number and size of spaces which may be discharged by the ejectors.

62. In a type-justifying machine, the combination with the space-selecting rack having suitable elevations and depressions, and automatic means for setting said rack for the selection of justifying-spaces, of a series of space-selecting forms, and automatic means, operating for each word interval in a line, for raising the forms to a common elevation and lowering said forms for relative adjustment upon the rack.

63. In a type-justifying machine, the combination with the space-magazine, and the ejectors, of a series of space-selecting forms, a space-selecting rack, automatic means for setting said rack for the selection of justifying-spaces, springs for independently pressing said forms into engagement with the rack, and automatic means, operating for each word interval in a line, for raising said forms periodically to a common level.

64. In a type-justifying machine, the combination with a space-magazine having a plurality of channels, of means for ejecting spaces from one or more of said channels simultaneously, and a space-collector comprising a series of movable plates arranged to convey the spaces from the several channels to a common point.

65. In a type-justifying machine, the combination with the magazine having a plurality of channels, of a space-collector comprising a plurality of plates each having an opening to receive a space or spaces, means for bringing said openings respectively to register with the several space-channels in the magazine, and means for subsequently causing said openings to register with each other to collect the selected spaces.

66. In a type-justifying machine, the space-collector comprising a series of plates each having an opening to receive a space or spaces and a cam-slot to govern its movement, a common pin passing through the cam-slots, and means for moving the pin to operate the plates.

67. In a type-justifying machine, the combination with the space-magazine having a series of channels, of a space-collector comprising a movable carriage, a series of collecting-plates upon said carriage, means for reciprocating the carriage, and means for moving the plates relatively to each other, whereby the space-receiving portions of said plates are alternately brought to register with the magazine-channels and with each other, for the purpose set forth.

68. In a type-justifying machine, the combination with the magazine having a plurality of channels, of a space-collector comprising a carriage reciprocating upon a table, a series of plates upon said carriage and each provided with a cam-slot and a space-receiving portion, a vibrating arm carried by said carriage, a cam-slot in said sustaining-table, and a pin carried by said arm and extending through the cam-slots in the several collecting-plates and the table.

69. In a type-justifying machine, the combination with the word-cut-off channel, of a space-magazine having a plurality of channels, and a space-collecting device comprising a series of plates adapted to simultaneously convey spaces from the several space-channels into registering position with the word-cut-off channel.

70. In a type-justifying machine, the comnation with the word-cut-off channel, and the space-magazine having a plurality of channels, of a space-collector constructed and arranged to convey a plurality of spaces simultaneously from the space-channel into registering position with the word-cut-off channel, and a plunger for moving said spaces into the word-cut-off channel.

71. In a type-justifying machine, the combination with automatic devices for measuring an unjustified line and counting the word-spaces therein, of a space-magazine having a plurality of channels, a series of selecting-forms for determining the spaces to be ejected from the magazine, a space-selecting rack for determining the adjustment of said forms, and connections between said rack and the automatic counting and measuring devices, for the purpose set forth.

72. In a type-justifying machine, the combination with a space-magazine having a plurality of channels, of a space-ejecting plunger reciprocating at the bottom of each channel, and selecting-forms vertically movable beneath the magazine and having parts adjacent to the plungers and adapted to support the spaces in the channels when the plungers are withdrawn, the positions of said forms determining the numbers of spaces ejected by each forward movement of the plungers.

73. In a type-justifying machine, the combination with a space-magazine having a plurality of channels, of a plurality of vertically-adjustable, independently-movable, selecting-forms beneath the channels, each form having a slotted end supporting the spaces in a channel, and an ejecting-plunger for each channel arranged to reciprocate the slot of the corresponding form, for the purpose set forth.

74. In a type-justifying machine, the combination with the space-magazine, of the space-ejectors, an independent selecting-form movable vertically beneath each channel of the magazine, means for operating said forms to select spaces for a line, and automatic means for rendering said forms inoperative to prevent the discharge of spaces from the magazine while the line is being transferred to a galley.

75. In a type-justifying machine, the combination with the line-transferring and word-cut-off channels, of a space-magazine, space-ejectors, a reciprocating carriage provided with space-collecting devices, and a word-separator knock-out plate carried by said carriage and reciprocating between the transferring and cut-off channels, for the purpose set forth.

76. In a type-justifying machine, the combination of a laterally-movable word-cut-off channel, the space-collector comprising a series of independently-movable plates having space-receiving slots, means for bringing said slots to register with each other and with the cut-off channel, and a plunger arranged to transfer the spaces from said slots into the cut-off channel.

77. In a type-justifying machine, the combination with line-measuring and word-space-counting devices of a cam having two grooves therein, an arm having a roller adapted to travel in either of said grooves, a switch-block normally closing one of said grooves against said roller, and means for shifting said block and throwing said roller into the other groove, for the purpose set forth.

78. In a type-justifying machine, the combination with line-measuring and word-space-counting devices of a cam having two grooves therein, one adapted for line movements and the other for word movements, an arm provided with a roller adapted to travel in either of said grooves, a switch-block normally closing the entrance to the line-operating groove, and means for changing the position of said block and throwing said roller into the line-operating groove upon the completion of the spacing of a line.

79. In a type-justifying machine, the combination of a cam having two grooves therein, an arm provided with a roller adapted to travel in either of said grooves, a switch-block normally closing the entrance to one of said grooves against said roller, a cam-plate normally retained out of the path of said block, and a cam operated by the line mechanism of the machine for controlling said cam-plate, for the purpose set forth.

80. In a type-justifying machine, the combination of a reciprocating carrier, a block forming one wall of a type-channel and having a pin-and-slot connection with said carrier, a plate forming the other wall of the channel and having a reciprocating movement on said carrier by means of which it may be withdrawn out of the path of the block, a galley, a reciprocating galley-rule normally closing the mouth of the galley, and means for withdrawing said plate and a galley-rule simultaneously to permit the line to be shifted from the channel into the galley.

81. In a type-justifying machine, the combination with the galley and the reciprocating galley-rule normally closing the mouth of the galley, of a laterally-movable channel, a reciprocating plate forming one side of said channel, means for withdrawing said plate and rule simultaneously, a block forming the other side of said channel, and means for advancing said block when the plates are withdrawn to transfer a type-line to the galley.

82. In a type-justifying machine, the combination of the galley, the galley-closing rule provided with an interlocking pin, the cam and connections for withdrawing said rule and permitting a line to enter the galley, and the laterally-movable channel having for one side a reciprocating plate adapted to interlock with the pin on the galley-rule, for the purpose set forth.

83. In a type-justifying machine, a laterally-movable word-cut-off channel, means for inserting type-words and justifying-spaces alternately into said channel to form a justified line, a friction-block movable in said channel by the advancing type-line, means for removing the type from the line to a galley, and means for returning said friction-block to its initial position.

84. In a type-justifying machine, the combination with the space-selecting rack having suitable elevations and depressions, of a magazine having a series of space-channels, a series of space-selecting forms, one for each space-channel, and automatic means for setting said rack and forms for the selection of justifying-spaces from said space-channels to justify a line of type, said means being governed by the line shortage and the number of intervals.

85. In a type-justifying machine, the combination with a space-selecting rack having suitable elevations and depressions, of a series of space-selecting forms, means for raising and lowering the forms to reset the same for each interval in a line of type, and automatic means for adjusting the selecting-rack, said means being controlled in accordance with the line shortage and the number of intervals.

86. A type-separator having a body equal in length to the height of the type and a pair of prongs extending beyond the body at each end.

87. In a type-justifying machine, the combination with a line of type, of word-separators having forked ends projecting beyond the type, for the purpose set forth.

88. The combination with a type-channel having alining ribs or blades, of a line of type provided with word-separators having forked ends arranged to embrace said ribs or blades, whereby the type may be alined when provided with projecting separators.

89. In a type-justifying machine, a line-transferring channel rotatable about an axis which is not parallel with the channel whereby the direction of the line is changed as the channel is rotated.

90. In a type-justifying machine, the combination of a line-transfer channel rotatable about an axis which is not parallel with said channel, and two channels out of parallel with each other with which said line-channel may be made to register.

91. In a type-justifying machine, a line-transferring channel, in combination with a stud upon which said channel rotates, said line-channel and stud being at an angle to each other whereby the line-channel is made to assume different planes in its different positions, for the purpose set forth.

92. In a type-justifying machine, the combination with a vertical line-channel, and an inclined justifying-channel, of a transfer-channel adapted to carry lines from the line-channel to the justifying-channel, said transfer-channel being movable about an inclined axis whereby it is made to aline alternately with the line-channel and the justifying-channel.

93. In an organized machine for setting and justifying a line of type, means for setting the type into words, a space-key for inserting a false space between the words, means for ascertaining the total difference between the length of a set line and a standard line, means for dividing said difference by the number of word-spaces in the line, a space-determining device for supplying the line to be justified with true spaces, connections between said device and said dividing means whereby said device is primarily set for each line to be justified, combined with means controlled by the depression of the space-key during the setting of said line for moving said device from the position in which it is so set to cause it to determine the proper combination of spaces to justify the line.

94. In a machine for justifying type, the combination of a mechanism for selecting a series of spaces of equal or different sizes for the purpose of justification, an averaging mechanism in operative relation to the space-selecting mechanism and mechanism for setting said averaging mechanism during the composition of any line so that it will cause said selecting mechanism to select spaces of the same or varying sizes as may be necessary to justify said line.

95. In a machine for setting and justifying type, an averaging mechanism for determining what proportion of the total number of spaces necessary in any line shall be of one size and what proportion of the next size in order to properly justify the line, a space-key, and connections between said averaging mechanism and said space-key, whereby said averaging mechanism is set by the depression of the space-key.

96. In a type setting and justifying machine, a space-registering device, which consists of the combination of a line of shafting suitably mounted and connected by crank-arms and levers to convey a rocking movement, means to rock said line of shafting by the operation of the space-setting mechanism of the type-setting machine, and means operated by the rocking of said line of shafting to register in the controlling mechanisms of the justifier one unit of movement with each operation of the space-setting mechanism.

97. In an organized machine for setting and justifying a line of type, means for setting the type into words, a space-key, a space-registering device controlled by the space-key, means for ascertaining the difference between the length of a set line and a standard line, means for dividing said difference by the number of word-spaces in the line, a justifying-space-determining device, and connections between said device and said dividing means whereby said device is set for each line to be justified, combined with means controlled by the depression of the space-key during the setting of said line for moving said device from the position in which it is so set to cause it to determine the proper combination of spaces to justify the line.

98. In an organized machine for setting and justifying a line of type, means for setting the type into words, a space-key, a space-registering device controlled by the space-key during the setting of the line, means for ascertaining the difference between the length of a set line and a standard line, means for dividing said difference by the number of word-spaces in the line, a justifying-space-determining device, and connections between said device and said dividing means whereby said device is set for each line to be justified.

99. In an organized machine for setting and justifying a line of type, means for setting the type into words, a space-key for inserting a false space between the words, a space-registering device controlled by the space-key during the setting of the line, means for ascertaining the difference between the length of a set line and a standard line, means for dividing said difference by the number of word-spaces in the line, a justifying-space-determining device, and connections between said device and said dividing means whereby said device is set for each line to be justified.

100. In a justifying mechanism, a word-space-counting device comprising a plurality of bars or elements, and means for actuating the same in succession to represent the numbers of word-spaces in successive lines of type.

101. In a justifying mechanism, a word-space-counting device comprising a rotatable drum, a plurality of bars or elements carried by said drum and having a reciprocating movement thereon, and means for setting said bars or elements successively to represent the numbers of word-spaces in successive line of type.

102. In a justifying mechanism, a word-space-counting device comprising a plurality of bars or elements, a carrier therefor, and means for moving said carrier to bring said bars or elements successively into position and for actuating said bars or elements successively for different lines of type.

103. In a justifying mechanism, a word-space-counting device comprising a plurality of bars or elements, a carrier therefor, a space-key, and means for bringing said bars or elements successively under the influence of said space-key whereby said bars may be set in accordance with the numbers of word-spaces in successive lines of type.

104. In a justifying mechanism, a wordspace-counting device comprising a plurality of bars or elements, devices for setting said elements, devices for applying them in justification, and means for moving said elements successively between said devices.

105. In a justifying mechanism, the combination of a channel in which the type and separators are assembled, a counting device including a toothed bar, and means for adjusting the toothed bar each time a separator is selected.

106. In a type setting and justifying machine, means for assembling a line of type and word-separators, in combination with a separator-counting toothed bar and means for moving said toothed bar step by step as the separators are inserted in a line.

107. In a type setting and justifying machine, the combination with means for assembling a line of type and separators, of a separator-counting toothed bar, means for moving said toothed bar step by step as the separators are assembled in a line, and means for measuring the line including the separators.

108. In a type setting and justifying machine, means for assembling a line of type and word-separators, in combination with a separator-counting toothed bar, a moving pawl for said toothed bar, a holding-pawl, means for operating the moving pawl to feed the toothed bar forward as each separator is assembled in line, and means for throwing said pawls out of engagement and automatically returning the toothed bar to its initial position after each line is assembled.

109. In a type-justifying machine, the combinaton of a pivoted computing-bar, a slide connected with said bar, a word-counting bar, means for moving said slide to set the computing-bar, and means whereby the position of the word-counting bar limits the movement of said slide.

110. In a type setting and justifying machine, in combination, a vertically-arranged assembling-channel, means for assembling a line of type in said channel, and a movable foot adapted to engage the lowest type and raise the line into position to be measured.

111. In a type setting and justifying machine, in combination, a vertically-arranged assembling-channel, means for assembling a line of type in said channel, a foot or support movable into position below the line and adapted to support said line while being measured, and measuring devices arranged to engage the upper end of the line.

112. In a type setting and justifying machine, in combination, a vertically-arranged assembling-channel, and means for assembling a line of type therein, a sliding block adapted to be raised by the increasing line as the type are assembled, and measuring devices arranged to engage said block and measure the line under justification.

113. In a type-justifying machine, in combination, a line-holding channel, a measuring-slide, means for moving said slide, and means controlled by the length of the line for stopping the movement of said slide in position to indicate the measurement of the line.

114. In a type setting and justifying machine, the combination with means for assembling a line and computing the normal justifying-spaces for a line, of difference devices for distributing the remainder including an inclined gage for dividing the remainder by the difference between the sizes of spaces used in the machine, means for moving said gage to divide the remainder, and space-determining devices controlled by said gage.

115. In a type setting and justifying machine, the combination with means for assembling a line and computing the normal justifying-spaces therefor, of difference devices for distributing the remainder having a member movable in proportion to the remainder divided by the difference between the sizes of spaces used in the machine, means for moving said member to divide the remainder, and space-determining devices controlled by said member.

116. In a type setting and justifying machine, the combination with means for measuring a line, an interval-registering device set by the space-key, and a computing device for computing justifying-space values from the line shortage and the number of intervals, of a series of forms controlled by said computing device for forming or selecting said space values.

117. In a type setting and justifying machine, the combination with means for measuring a line, an interval-registering device set by the space-key, and a computing device for computing justifying-space values from the line shortage and the number of intervals, of a series of forms controlled by said computing device for forming or selecting said space values, and means for inserting said space values in the line.

BENJ. M. DES JARDINS.

Witnesses:
F. A. CUTTER,
EVA S. SHELTON.